US008990319B2

(12) United States Patent
Wiese et al.

(10) Patent No.: US 8,990,319 B2
(45) Date of Patent: Mar. 24, 2015

(54) SYSTEM AND METHOD FOR COORDINATING COMMUNICATION EVENTS USING COMPUTER-ASSISTED STRUCTURED INTERACTION

(75) Inventors: Jason Wiese, Pittsburgh, PA (US); Jacob Biehl, San Jose, CA (US); Althea Turner, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 470 days.

(21) Appl. No.: 12/986,920

(22) Filed: Jan. 7, 2011

(65) Prior Publication Data
US 2012/0054288 A1 Mar. 1, 2012

Related U.S. Application Data

(60) Provisional application No. 61/377,434, filed on Aug. 26, 2010.

(51) Int. Cl.
*G06F 15/16* (2006.01)
*G06Q 10/10* (2012.01)
*H04L 12/58* (2006.01)

(52) U.S. Cl.
CPC .............. *G06Q 10/109* (2013.01); *G06Q 10/10* (2013.01); *H04L 51/36* (2013.01)
USPC ........... 709/206; 380/255; 380/276; 713/150; 713/181; 726/2; 726/21

(58) Field of Classification Search
USPC ................... 706/206; 709/206; 380/225, 276; 713/150, 181; 726/2, 21
See application file for complete search history.

(56) References Cited

U.S. PATENT DOCUMENTS 6,870,916 B2 3/2005 Henrikson et al.
7,668,915 B2 2/2010 Couts et al.
(Continued)

FOREIGN PATENT DOCUMENTS

JP 10-228502 8/1998
JP 2003188998 A 7/2003
(Continued)

OTHER PUBLICATIONS

IP.com Prior Art Database (IPCOM000140626D; http://ip.com/IPCOM/000140626), Sep. 15, 2006.*
(Continued)

*Primary Examiner* — Jason K. Gee
*Assistant Examiner* — Sharif E Ullah
(74) *Attorney, Agent, or Firm* — Morgan, Lewis & Bockius LLP

(57) ABSTRACT

A computer-implemented method for negotiating a time and a medium for communications between users is described. The method is performed at a server including one or more processors and memory storing one or more programs. The method includes receiving a request from a first user to negotiate a time and a medium for communication with a second user. The request includes a plurality of acceptable mediums of communication. The method also includes generating a first notification based on the request. The first notification includes the plurality of acceptable mediums of communication. The method furthermore includes transmitting the first notification to the second user, and receiving a response to the first notification from the second user. The response indicates whether the second user has accepted one of the acceptable mediums of communication.

31 Claims, 25 Drawing Sheets

(56) References Cited

U.S. PATENT DOCUMENTS

| | | | |
|---|---|---|---|
| 7,730,134 B2 | 6/2010 | Blagsvedt et al. | |
| 7,801,954 B2 | 9/2010 | Cadiz et al. | |
| 7,822,821 B2 | 10/2010 | Foote | |
| 7,941,762 B1 | 5/2011 | Tovino et al. | |
| 8,078,578 B2 | 12/2011 | Roberts et al. | |
| 2002/0069249 A1* | 6/2002 | Pedersen | 709/204 |
| 2003/0217099 A1* | 11/2003 | Bobde et al. | 709/202 |
| 2004/0003042 A1 | 1/2004 | Horvitz et al. | |
| 2004/0064567 A1 | 4/2004 | Doss et al. | |
| 2005/0050206 A1 | 3/2005 | Ueda et al. | |
| 2006/0026237 A1* | 2/2006 | Wang et al. | 709/206 |
| 2006/0067250 A1 | 3/2006 | Boyer et al. | |
| 2006/0075091 A1 | 4/2006 | Beyda et al. | |
| 2006/0140189 A1 | 6/2006 | Wu et al. | |
| 2006/0149816 A1* | 7/2006 | Cadiz et al. | 709/206 |
| 2006/0222156 A1* | 10/2006 | Smith et al. | 379/207.14 |
| 2007/0022161 A1* | 1/2007 | Klug et al. | 709/206 |
| 2007/0064900 A1* | 3/2007 | Kowalewski et al. | 379/202.01 |
| 2007/0135119 A1 | 6/2007 | Hashimoto et al. | |
| 2009/0003542 A1* | 1/2009 | Ramanathan et al. | 379/88.13 |
| 2009/0005082 A1 | 1/2009 | Forstall et al. | |
| 2009/0104899 A1* | 4/2009 | Bakker et al. | 455/417 |
| 2009/0116403 A1* | 5/2009 | Callanan et al. | 370/254 |
| 2009/0288011 A1 | 11/2009 | Piran et al. | |
| 2010/0250424 A1* | 9/2010 | Torres | 705/37 |
| 2010/0280904 A1* | 11/2010 | Ahuja | 705/14.58 |
| 2011/0029824 A1 | 2/2011 | Scholer et al. | |
| 2011/0173260 A1 | 7/2011 | Biehl et al. | |
| 2011/0306298 A1 | 12/2011 | Lyman | |
| 2011/0307562 A1* | 12/2011 | Chakra et al. | 709/206 |
| 2012/0213345 A1* | 8/2012 | Agarwal | 379/88.18 |

FOREIGN PATENT DOCUMENTS

| | | |
|---|---|---|
| JP | 2005-071146 A | 3/2005 |
| JP | 2005514679 A | 5/2005 |
| JP | 2006-099462 A | 4/2006 |
| JP | 2006318019 A | 11/2006 |
| JP | 2008225756 A | 9/2008 |

OTHER PUBLICATIONS

Fuji Xerox Co., JP2011-128873, Notice of Rejection, Date of Mailing Feb. 21, 2012, 2 pages.

Begole, *Work Rhythms: Analyzing Visualizations of Awareness Histories of Distributed Groups*, CSCW '02, Nov. 16-20, 2002, New Orleans LA, pp. 334-343.

Brown, *Guided, Cooperative Learning and Individual Knowledge Acquisition*, Knowing, Learning, and Instruction, Lawrence Erlbaum, New Jersey, 1989, pp. 393-451.

Cadiz, *Designing and Deploying an Information Awareness Interface*, CSCW '02, Nov. 16-20, 2002, New Orleans LA, pp. 314-323.

Diehl, *Productivity Loss in Brainstorming Groups: Toward the Solution of a Riddle*, J. Personality and Social Psychology 1987, vol. 53, No. 3, pp. 497-509.

Dimicco, *Motivations for Social Networking at Work*, CSCW '08, Nov. 8-12, 2008, San Diego CA, pp. 711-720.

Dourish, *Portholes: Supporting Awareniess in a Distributed Work Group*, CHI '92, May 3-7, 1992, pp. 541-547.

Fogarty, *Examining Task Engagement in Sensor-Based Statistical Models of Human Interruptibility*, CHI 2005, Apr. 2-7, 2005, Portland OR, pp. 331-340.

Fogarty, *Toolkit Support for Developing and Deploying Sensor-Based Statistical Models of Human Situations*, CHI 2007, Apr. 28-May 3, 2007, San Jose CA, pp. 135-144.

Gabarro, *The Development of Working Relationships*, In J. Lorsch, Handbook of Organizational Behavior, Prentice Hall, 1987, Chapter 12, pp. 172-189.

Gutwin, *A Descriptive Framework of Workspace Awareness for Real-Time Groupware*, Kluwer Academic Publishers, 2001, pp. 1-47.

Hong, *An Architecture for Privacy-Sensitive Ubiquitous Computing*, MobiSys, '04, Proceedings of the 2nd International Conference on Mobile Systems, Application, and Services, ACM 2004, 12 pgs.

Horvitz, *Learning and Reasoning about Interruption*, ICMI '03, Nov. 5-7, 2003, Vancouver BC Canada, pp. 20-27.

Krauss, *Mutual Knowledge and Communicative Effectiveness*, In J. Galegher, R. Kraut and C. Egido, Intellectual Teamwork: Social and Technological Foundations of Cooperative Work, Lawrence Erlbaum Associates Inc., 1990, pp. 111-145.

Marx, *CLUES: Dynamic Personalized Message Filtering*, CSCW '96, Cambridge MA, 1996, pp. 113-121.

Milewski, *Providing Presence Cues to Telephone Users*, CSCW '00, Philadelphia PA, Dec. 2-6, 2000, pp. 89-96.

Olson, *Distance Matters*, Human-Computer Interaction, 2000, vol. 15, pp. 139-178.

Olson, *Small Group Design Meetings: An Analysis of Collaboration*, Human-Computer Interaction, 1992, vol. 7, pp. 347-374.

Paulus, *Idea Generation in Groups: A Basis for Creativity in Organizations*, Organizational Behavior and Human Decision Processes, vol. 82, No. 1, May 2000, pp. 76-87.

Salber, *The Context Toolkit: Aiding the Development of Context-Enabled Applications*, CHI '99, May 15-20, 1999, Pittsburgh PA, 8 pgs.

Sawyer, *Group Genius: The Creative Power of Collaboration*, New York NY, Basic Books, 2007.

Tang, *Approaching and Leave-Taking: Negotiating Contact in Computer-Mediated Communication*, ACM Transactions on Computer-Human Interaction, May 2007, vol. 14, No. 1, Article 5, pp. 1-26.

Tang, *ConNexus to Awarenex: Extending awareness to mobile users*, SIGCHI '01, Mar. 31-Apr. 4, 2001, Seattle WA, 8 pgs.

Tsai, *Social Capital and Value Creation: The Role of Intrafirm Networks*, The Academy of Management Journal, Aug. 4, 1998, vol. 41, No. 4, pp. 464-476.

Twitter, *Share and Discover What's Happening Right Now, Anywhere in the World*, Twitter.com, downloaded Jan. 21, 2010, 3 pgs., http://twitter.com.

Wiberg, *Managing Availability: Supporting Lightweight Negotiations to Handle Interruptions*, ACM Transactions on Computer-Human Interaction, Dec. 2005, vol. 12, No. 4, pp. 356-387.

Wikipedia, *JammerDirect*, JammerDirect.com, downloaded Jan. 21, 2010, 3 pgs, http://en.wikipedia.org/wiki/Jammer_Direct.

Nakajima, Jun, Office Action, App No. JP2010-184824, Apr. 7, 2014, 6 Pgs.

\* cited by examiner

Figure 13. Ping/Nudge System Design

Figure 16. Ping Sequence

Figure 17. Nudge Sequence System Diagram

Figure 21

Step 1

Step 2

Figure 24

SYSTEM AND METHOD FOR COORDINATING COMMUNICATION EVENTS USING COMPUTER-ASSISTED STRUCTURED INTERACTION

RELATED APPLICATIONS

This application claims priority to U.S. Provisional Application Ser. No. 61/377,434, filed Aug. 26, 2010, entitled "System and Method for Coordinating Communication Events Using Computer-Assisted Structured Interaction," which is incorporated by reference herein in its entirety.

This relates to U.S. patent application Ser. No. 12/687,638, filed Jan. 14, 2010, entitled "System and Method for Determining a Presence State of a Person," which is incorporated by reference herein in its entirety.

TECHNICAL FIELD

The disclosed embodiments relate generally to computer-assisted communications.

BACKGROUND

Effective communication is essential to enabling successful collaboration. It enables collaborators to build common ground, to foster ideas, to develop the complex interpersonal relationships that facilitate effective interactions, and more. In the modern workplace, successful collaboration translates into improved productivity, creativity, and the overall well-being of workers. An important aspect of effective communication is having ongoing group awareness, which includes knowledge of current projects, the current status of co-workers, and how actions of group members may affect other group members.

Fostering group awareness has become an increasingly difficult challenge in today's modern workplaces. Workers may have flexible schedules (e.g., working outside the typical 9-6 workday, working in different time zones, etc.) or may work from remote locations (e.g., such as distributed work locations, client sites, at home, public places, etc.). Furthermore, workers use increasingly specialized collaboration tools (e.g., video chat, virtual world, social networks, etc.) to communicate with peers. Accordingly, determining group awareness of co-workers is difficult, time consuming, and error prone. Thus, it is highly desirable to provide a system and method for determining a presence state of a person without the aforementioned problems.

In addition, the modern workplace is becoming increasingly more distributed and mobile. In today's organizations, it is not uncommon for employees working on the same team or project to be scattered all over the world, across different time zones and cultures, working irregular or extended work hours. While there are many modern tools for enabling communication across distances (e.g., phone, email, and instant messaging), these tools by themselves lack the ability to assist in initiating contact. That is, these tools still require workers to determine the availability, appropriateness, and utility of a chosen communication channel and when to use it.

Simple impediments such as knowing if a co-worker is available to communicate, where that coworker is located, and what communication channels are available hinder and often prevent communication. Recent research has shown that these deficiencies have dramatic impact on workers' ability to successfully collaborate. A consistent result is that casual, impromptu interactions rarely occur between workers who are not co-located. Since these types of exchanges have been shown to be predominant and important in collaborative creativity and problem solving, this result is of concern.

Current technological support for helping workers to initiate collaboration is significantly lacking. Most existing technology is limited to providing a single channel of presence or state. For instance, many instant messaging (IM) clients provide details about whether or not a worker is active inside the particular communication tool. Other systems, such as FXPAL's MyUnity system, provide multiple levels and sources of awareness information that allow workers to be more informed before initiating communication. However, these systems also lack direct facilities to help workers initiate and foster communication among peers.

SUMMARY

To address the aforementioned deficiencies, some embodiments provide a system, a computer readable storage medium including instructions, and a method for coordinating communication events using computer-assisted structured interaction.

Embodiments address deficiencies in existing technology-mediated communication by providing a system and method to allow individuals to easily and naturally initiate communication. Some embodiments provide two structured interaction models: the Ping and the Nudge. The Ping allows individuals to provide other individuals or groups of individuals with short, push-style messages that provide timely context-related information about a person's availability or state. The Nudge provides a structure for a negotiation to choose when and on what channel to initiate communication. Some embodiments combine the new structured interaction models with information and features provided by existing multi-channel awareness tools, e.g., FXPAL's MyUnity system, some aspects of which are described in the U.S. patent application Ser. No. 12/687,638 and herein, with respect to FIGS. 1-10 of the present application. Embodiments can be configured to run on computers of several different form factors, including on a traditional desktop computer, on a laptop, and/or on a mobile smart phone.

The FXPAL MyUnity system uses a display of photo tiles with colored borders indicating the current presence state, with the ability to view more detailed information on individuals (e.g., contact information, calendar data, and communication tools are currently available for each individual). With the extensions described in this application, the system also provides two additional interaction choices, the Ping and the Nudge, which use structured interactions to explicitly extend the current awareness information of the initiator (Ping) and to facilitate a structured negotiation for a time and medium for a future conversation given awareness information about each participant (Nudge).

In some embodiments, the Nudge features enable users to initiate structured interaction from any device running a compatible software application to any other parties' devices also running compatible software applications. The devices on which the software runs include phones, desktops, laptops, etc. Moreover, this structured interaction can be used to initiate communication on a variety of mediums, including phone, instant messaging (IM), short message service (SMS), and face-to-face. In some embodiments, the structured interaction includes the current awareness information and calendar data of relevant users.

Some embodiments provide an application that implements a method for negotiating a time and medium for a communication between users. In some embodiments, the method is performed at a server including one or more processors and memory storing one or more programs, the one or more processors executing the one or more programs to perform the operations of the method. The method includes receiving a request from a first user to negotiate a time and a medium for communication with a second user. The request includes a plurality of acceptable mediums of communication including a preferred medium of communication. The method also includes generating a first notification based on the request. The first notification includes the plurality of acceptable mediums of communication including the preferred medium of communication. The method furthermore includes transmitting the first notification to the second user, and receiving a response to the first notification from the second user. The response indicates whether the second user has accepted the preferred medium of communication. When the response indicates that the second user has suggested an alternative medium of the communication selected from the plurality of acceptable mediums of the communication, in some embodiments the method includes generating a second notification to the first user. The second notification includes the alternative medium of communication. In such embodiments, the method also includes transmitting the second notification to the first user, and receiving a response to the second notification from the first user. The response indicates whether the first user has accepted the alternative medium of communication. In some embodiments, a notification is sent to the users in response to any action taken by one of the users—e.g., when a user accepts or rejects a proposed time and medium, or proposes an alternative time and/or medium.

Some embodiments provide an application that implements a method to allow the first and second users to converge on/negotiate an agreed communication medium, even if that is not the preferred medium proposed by the first user. These alternatives include:

- When the response indicates the first user has accepted the alternative medium of communication: transmitting a confirmation message to the first user and the second user, wherein the confirmation message indicates that the first user has accepted the alternative medium of communication;
- When the response indicates the first user has indicated that the alternative medium of communication is not acceptable: generating a third notification to the second user indicating that the alternative medium of communication is not acceptable; and transmitting the third notification to the second user;
- When the response indicates that the second user has accepted the preferred medium of communication: transmitting a confirmation message to the first user and the second user, wherein the confirmation message indicates that the second user has accepted the preferred medium of communication); and
- When a medium of communication (and time) for a meeting is agreed on between the first and second users, transmitting a calendar event corresponding to the agreed medium of communication (whether it is the preferred medium of communication or the alternative medium of communication) to the first user and the second user.

Some embodiments provide one or more computer systems that perform any of the methods described above so as to enable multiple users to coordinate and agree on a time and a medium for communications among the multiple users.

Some embodiments provide computer-readable storage media storing computer instructions that, when executed in a computer system having a processor and memory, cause such computer system to perform any of the methods described above.

BRIEF DESCRIPTION OF THE DRAWINGS

FIG. 21 shows a series of screenshots associated with an exemplary Nudge sequence that highlights a possible order of send and receive operations and roles.

FIG. 24 shows a series of screenshots associated with an exemplary Ping sequence that highlights a possible order of operations.

Like reference numerals refer to corresponding parts throughout the drawings.

DESCRIPTION OF EMBODIMENTS

Methods and systems for coordinating communication events using computer-assisted structured interaction are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well-known to those of ordinary skill in the art are not described in detail to avoid obscuring aspects of the present invention.

It will also be understood that, although the terms first, second, etc. may be used herein to describe various elements, these elements should not be limited by these terms. These terms are only used to distinguish one element from another. For example, a first notification could be termed a second notification, and, similarly, a second notification could be termed a first notification, without departing from the scope of the present invention. The first notification and the second notification are both notifications, but they are not the same notification.

The terminology used in the description of the embodiments herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Some embodiments provide group awareness information to subscribers by processing one or more data feeds that monitor the presence states of users and publishing respective presence states of the users to a group of subscribers. In some embodiments, the subscribers are notified as to a person's current location, availability, current task, and/or preferred communication channels.

Figure 1:
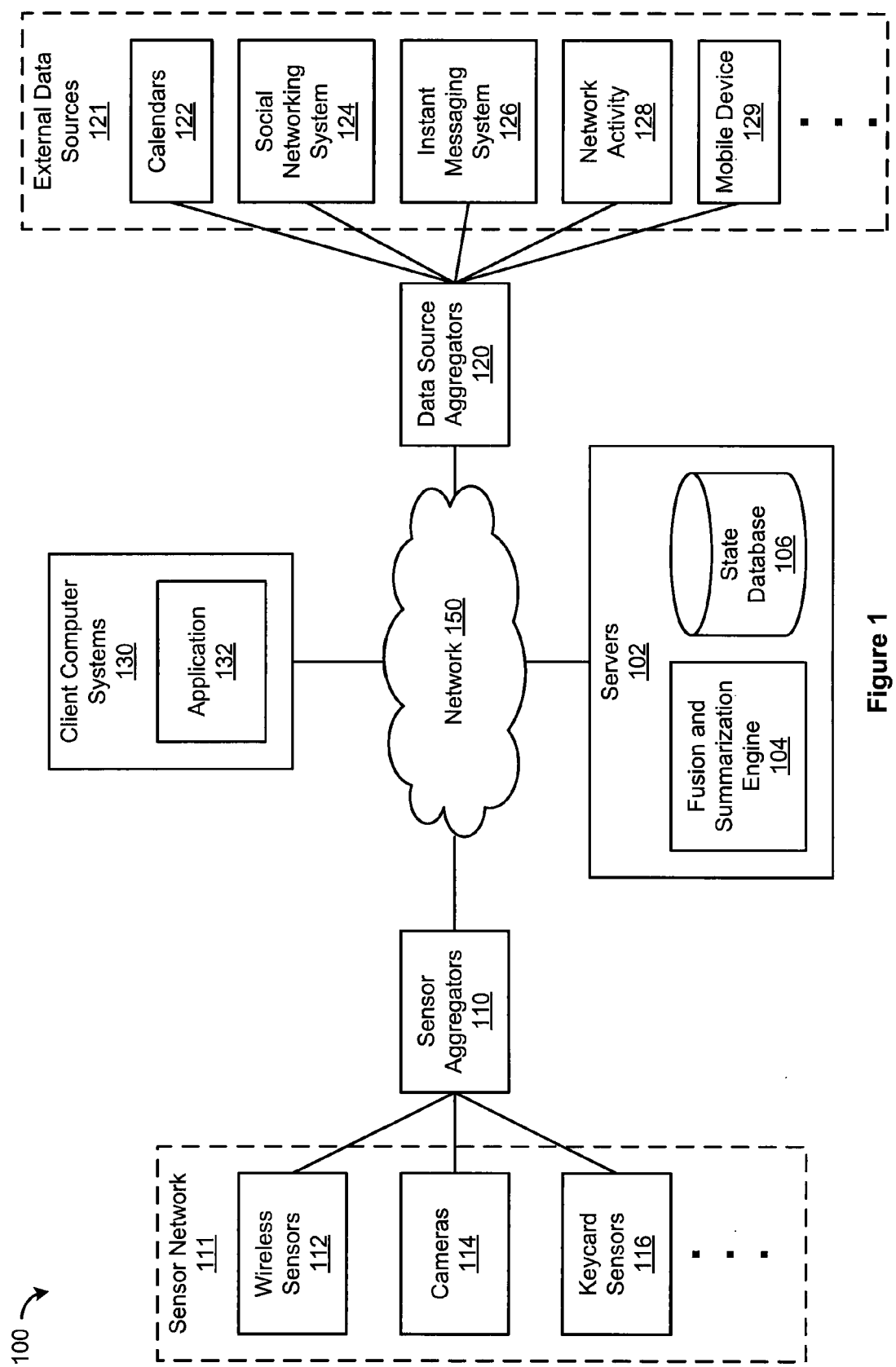
FIG. 1 is a block diagram illustrating a system for determining a presence state of a person, according to some embodiments.

FIG. 1 is a block diagram illustrating a system 100 for determining a physical presence state of a person, according to some embodiments. The system 100 includes servers 102, sensor aggregators 110, data source aggregators 120, and client computer systems 130. The servers 102, the sensor aggregators 110, the data source aggregators 120, and the client computer systems 130 are coupled to each other via network 150. Network 150 can generally include any type of wired or wireless communication channel capable of coupling together computing nodes. This includes, but is not limited to, a local area network, a wide area network, or a combination of networks. In some embodiments, network 150 includes the Internet.

In some embodiments, the sensor aggregators 110 aggregate sensor data received from a sensor network 111. Each sensor in the sensor network 111 provides a data feed to the sensor aggregators 110. The sensor aggregators 110 aggregate the data included in the data feeds received from the sensors in the sensor network 111 and provides one or more aggregated data feeds to the servers 102. In some embodiments, the sensor network 111 includes one or more of wireless sensors 112, cameras 114, and keycard sensors 116.

In some embodiments, the wireless sensors 112 are placed at predetermined locations (e.g., within a building, outside of the building, within range of a particular wireless sensor, etc.). In these embodiments, each of the wireless sensors 112 provides a data feed (e.g., also referred to as a "wireless data feed") including data about wireless devices registered to persons that are within range of the wireless sensors 112. In some embodiments, the wireless sensors 112 include a Bluetooth sensor, a Wi-Fi sensor, a cellular sensor, an RFID sensor, a radio frequency sensor, and an ultrasonic sensor. Note that other wireless sensors may be used.

Figure 8:
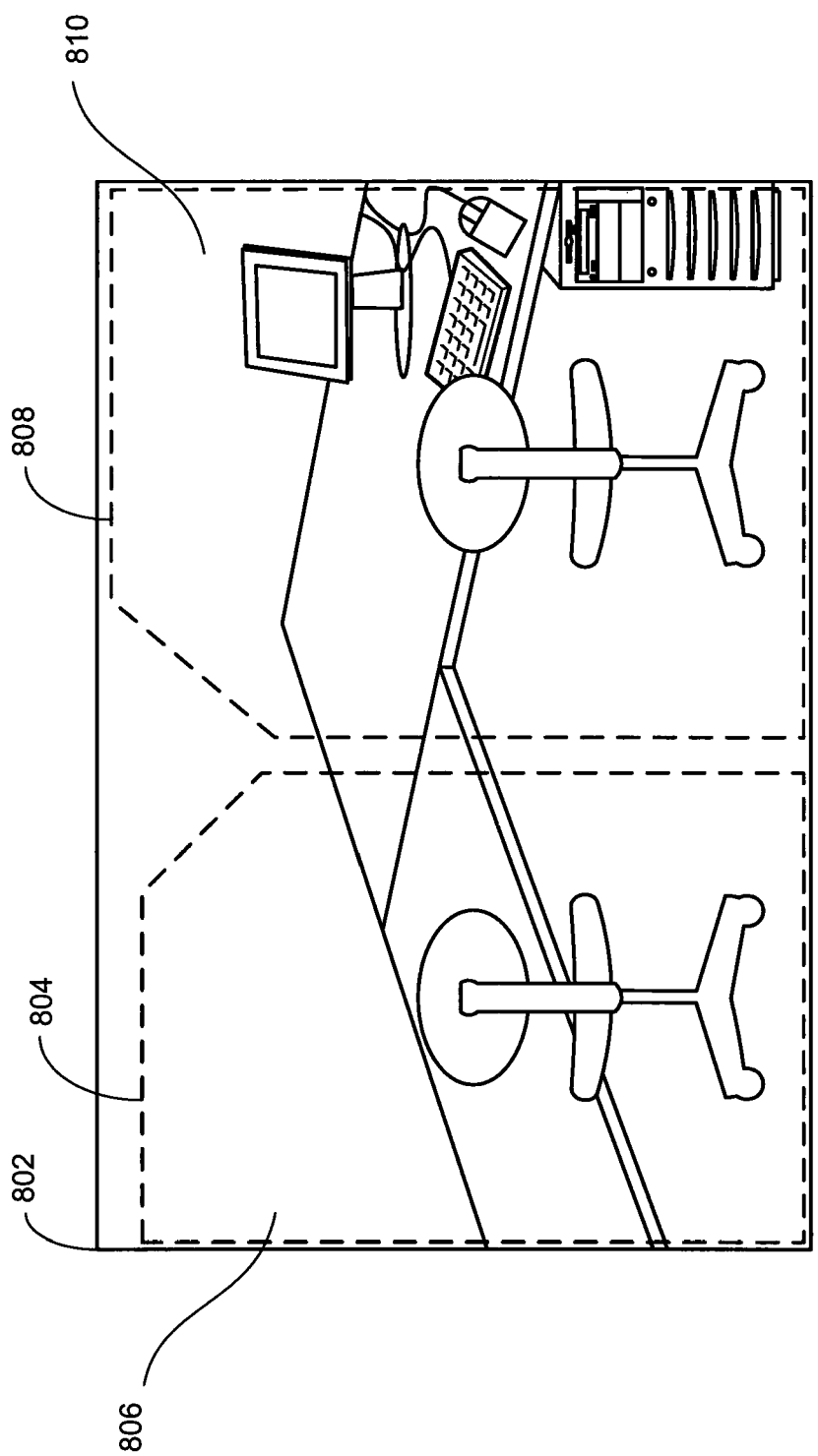
FIG. 8 illustrates a frame of a camera data feed showing an exemplary workspace of a person, according to some embodiments.

In some embodiments, the cameras 114 are located within offices of persons. In these embodiments, a respective camera provides a video data feed of at least a workspace of a respective person that is analyzed to determine whether the respective person and/or a visitor is in the office of the respective person. In some embodiments, the person defines an area of the workspace typically occupied by the person when the person is in the office. In some embodiments, the person defines an area of the workspace typically occupied by a visitor when a visitor is in the office. For example, FIG. 8 illustrates a frame 802 of a camera data feed showing an exemplary workspace of a person, according to some embodiments. As illustrated in FIG. 8, the person drew a bounding box 804 for a zone 806 of the workspace of the person that is typically occupied by a visitor when a visitor is in the office. The person also drew a bounding box 808 for a zone 810 of the workspace of the person that is typically occupied by the person when the person is in the office. Note that some persons may share offices or may work in cubicles. In these cases, a single camera may provide a video data feed that includes workspaces of more than one person. Accordingly, each person defines the person's respective workspace and respective visitor spaces.

In some embodiments, the keycard sensors 116 are placed at predetermined locations (e.g., at predetermined doors inside and outside of a building, etc.). In these embodiments, each of the keycard sensors 116 provides a keycard data feed including data about times at which a keycard registered to a person was used at a keycard sensor 116.

Note that other sensors may be used. For example, a microphone in an office may be used to detect office activity based on sound patterns. Similarly, a light sensor may be used to detect overall ambient light to determine if the office is occupied. Furthermore, multiple sensors may be used in combination to determine how many people are in a given location (e.g., a camera data feed and a microphone data feed may be used to determine number of people present in the physical environment).

In some embodiments, a separate sensor aggregator aggregates data from each type of sensor (e.g., the wireless sensors 112, the cameras 114, the keycard sensors 116, etc.).

In some embodiments, the data source aggregators 120 aggregate data received from external data sources 121. Each data source in the external data sources 121 provides a data feed to the data source aggregators 120. The data source aggregators 120 aggregate the data included in the data feeds received from the data sources in the external data sources 121 and provide one or more aggregated data feeds to the servers 102. In some embodiments, the external data sources 121 include calendars 122, social networking systems 124, instant messaging systems 126, network activity data source 128, and mobile device data sources 129.

In some embodiments, the calendars 122 are calendars for persons. In these embodiments, each of the calendars 122 provides a calendar data feed including locations and times of appointments of a respective person. Note that the respective person may have more than one calendar and all or a subset of these calendars may be used. In some embodiments, the calendar is selected from the group consisting of: a personal calendar, a group calendar, an event calendar, and a business calendar.

The social networking systems 124 and the instant messaging systems 126 typically allow persons to provide user-updated statuses. Thus, in some embodiments, the social networking systems 124 and/or the instant messaging systems 126 provide user-updated status data feeds including the current statuses of persons posted on the social networking systems 124 and/or the instant messaging systems 126.

In some embodiments, the network activity data source 128 monitors network activity of network devices that are registered to persons. In some embodiments, the network data feed monitors data in a network selected from the group consisting of: an office computer network, office phone network, a public computer network, and a home computer network. A location of a network device may be determined by analyzing a network address (e.g., an Internet Protocol address) to determine a location associated with the address. For example, an Internet Protocol (IP) address may be analyzed to determine a geographic location associated with the IP address. In some embodiments, the network devices are located at predetermined locations (e.g., within a building, at particular buildings, etc.). For example, the network activity data source 128 may indicate that a person's office computer is offline, the person's office computer is online and on the corporate LAN, the person's office computer is online and on the corporate VPN, the person's office computer is being used or not used, and the person's office phone is being used or not used. In these embodiments, a device identifier and/or a network address of the network device (e.g., a MAC address or an IP address) are analyzed to determine a location of the network device in the building. For example, the network address is used to perform a lookup in a database including information about registered network devices at predetermined locations.

Many mobile devices have positioning systems (e.g., a global satellite positioning system such as GPS and cellular tower-based positioning system) coupled to a communication system (e.g., Wi-Fi, Bluetooth, and cellular). Accordingly, these mobile devices may determine their respective positions and transmit data regarding their positions to the servers 102. Thus, in some embodiments, the mobile device data source 129 provides mobile device data feeds that report locations determined by mobile devices of persons.

Note that other external data sources may be used. For example, RSS feeds of announcements related to a specific person may be used to determine a presence state of persons. Similarly, a combination of external data sources may be used to determine the presence state of persons (e g., linking RSS feeds of meeting appointments at a particular location and time with user location/event data provided by external calendars).

In some embodiments, a separate data source aggregator aggregates data from each type of data source (e.g., the calendars 122, the social networking systems 124, the instant messaging systems 126, and the network activity data source 128, etc.).

In some embodiments, the servers 102 include a fusion and summarization engine 104 and a state database 106. In some embodiments, the fusion and summarization engine 104 receives data feeds from the sensor aggregators 110 and the data source aggregators 120 and determines a presence state of persons based on these data feeds.

In some embodiments, the fusion and summarization engine 104 summarizes data related to the derived state (e.g., the latest status message, the current location in the building). In some embodiments, the fusion and summarization engine 104 uses a hierarchical rule-based architecture to determine the presence states of persons. For example, the hierarchy of data feeds may be ordered as follows (ordered from data feed that is considered first to the one that are considered last): a camera data feed, a network activity data feed, a wireless data feed, a keycard data feed, user-updated status data feed, and a calendar data feed. Note that other orderings are possible. In some embodiments, the fusion and summarization engine 104 uses machine learning techniques (e.g., support vector machines or Bayesian Networks) to statistically determine presence states of persons. In some embodiments, the data feed that provides the highest level of specificity as to the presence state of a respective person is selected. For example, the levels of specificity may be ordered in the same manner as the hierarchy of data feeds in the hierarchical rule-based architecture. In some embodiments, the fusion and summarization engine 104 combines two or more data feeds to produce a higher level of specificity as to the presence state of a respective person.

In some embodiments, the state database 106 stores information collected from the sensor network 111 (e.g., via the sensor aggregators 110) and the external data sources 121 (e.g., via the data source aggregators 120) along with a time that the information was collected. In some embodiments, the state database includes historical presence states of persons and corresponding times when the historical presence states of the persons were determined. In some embodiments, the state database 106 also stores user configuration/preferences and usage logs. In some embodiments, the state database 106 stores information that allows an application 132 of the client computer systems 130 to interface with third-party communication tools.

Figure 6:
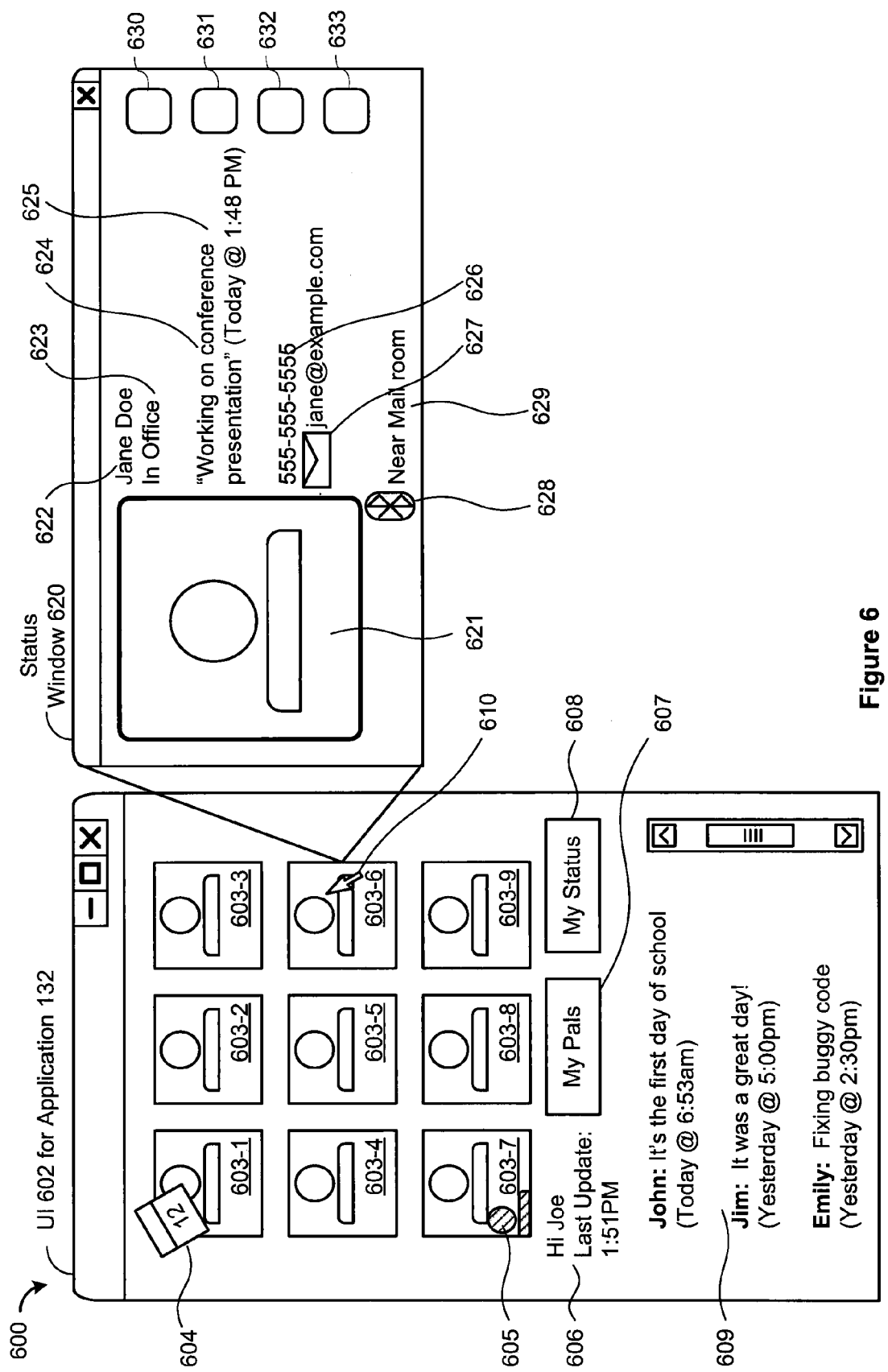
FIG. 6 is a block diagram illustrating a user interface of an application that reports the presence states of persons, according to some embodiments.

In some embodiments, the client computer systems 130 include the application 132 that provides access to the presence states of persons. In some embodiments, the application 132 reports details about how the device (e.g., the client computer systems 130, a mobile device) is connected to the network and whether the user is currently performing keyboard or mouse input actions. This information may be used by the fusion and summarization engine 104 to determine a presence state of a person using the device. Other information, such as currently active applications, may be provided as well. In some embodiments, the application 132 provides both a summary and detailed visualization of presence states and related data for persons in an organization. For example, FIG. 6 is a block diagram 600 illustrating a user interface 602 for the application 132 that reports the presence states of persons in an organization (e.g., a company, an office, a household, etc.), according to some embodiments. The user interface 602 for the application 132 displays a collection of tiles 603 representing persons in the organization. Each of the tiles 603 includes a name and a photograph of a respective person in the organization. In some embodiments, the tiles 603 are color coded and overlaid with icons to convey presence states of persons. For example, the tile 603-1 includes a calendar object 604 indicating that the person associated with the tile 603-1 has a calendar event (e.g., is at a meeting, an appointment, jury duty, vacation, conference, or any other event that may be indicated on a calendar). Similarly, the tile 603-7 includes a visitor object 605 indicating that the person associated with the tile 603-1 has a visitor in the office. Furthermore, a greyed-out tile may indicate that a person is not in the office or that the presence state of the person cannot be determined.

Clicking on (or hovering over) a particular tile in the user interface 602 for the application 132 provides a more detailed view of a particular person's presence state. For example, clicking on (or hovering over) the tile 603-6 produces a status window 620 corresponding to the particular person associated with the tile 603-6. The status window 620 may display a photograph 621 of the particular person, a name 622 of the particular person, a presence state 623 of the particular person, a user-updated status message 624 of the particular person and a time 625 that the user-updated status message was provided (e.g., as updated via the user interface 602 of the application 132), a phone number 626 of the particular person, an email address 627 of the particular person, a sensor 628 that is currently detecting devices registered to the particular person and a corresponding location 629 of the sensor 628. The status window 620 also includes clickable icons 630-633 that may be used to initiate communications with the particular person via corresponding communication channels (e.g., instant messaging or video conferencing).

The user interface 602 for the application 132 also includes information 606 about the last time that the tiles 603 were updated with new information. The "My Pals" tool 607 may be used to add, delete, and/or group persons of an organization. The user interface 602 for the application 132 also provides a data feed 609 displaying the current status messages entered and corresponding times at which the messages were entered by persons in the organization using the user interface 602 for the application 132.

In some embodiments, third party communications tools are linked to the user interface 602 for the application 132 so that persons in the organization can easily transition from gathering awareness about a particular person to engaging in a computer-mediated communication with that person.

Figure 2:
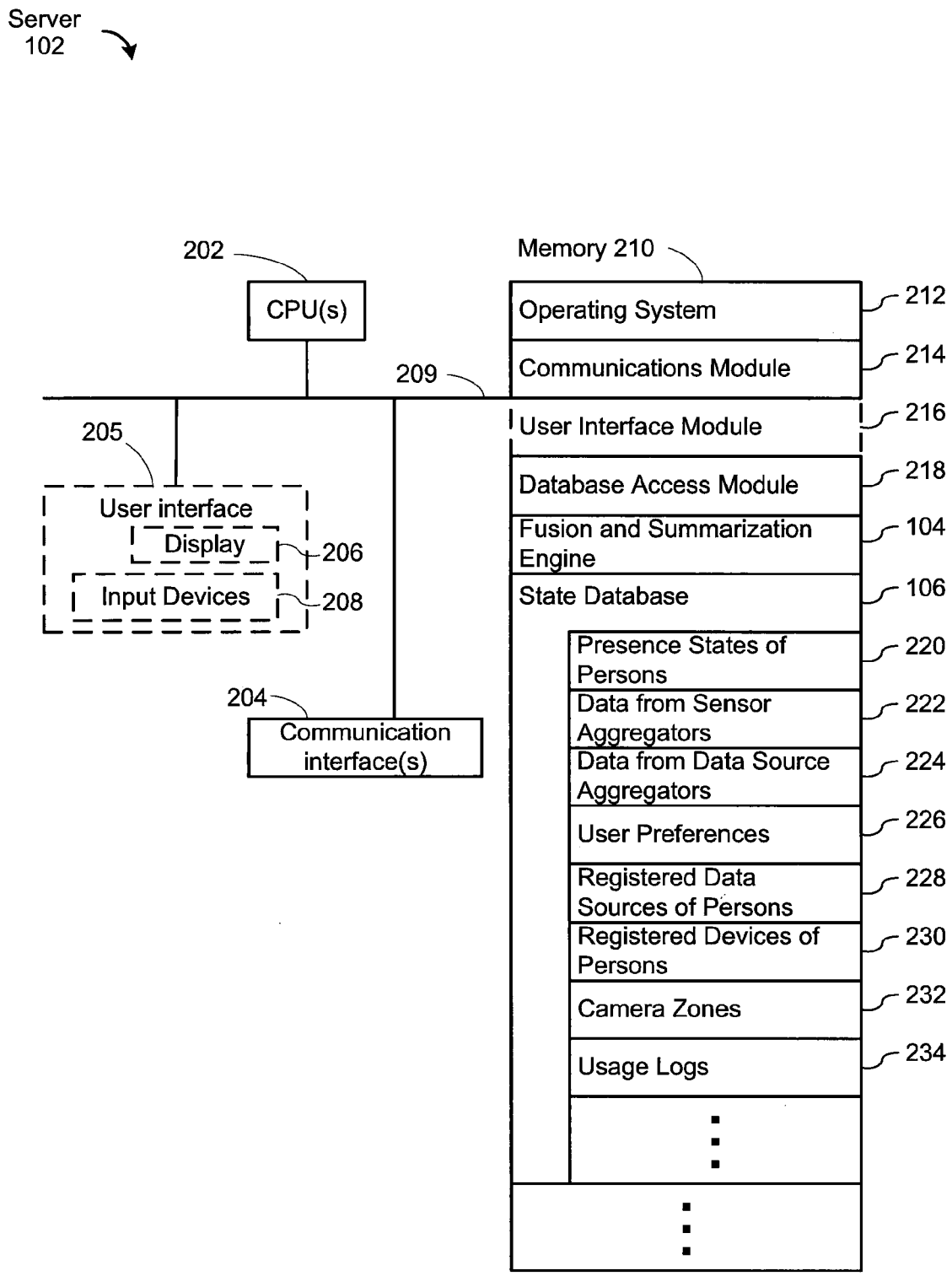
FIG. 2 is a block diagram illustrating a server, according to some embodiments.

FIG. 2 is a block diagram illustrating a server 102, according to some embodiments. The server 102 typically includes one or more processing units (CPU's) 202, one or more network or other communications interfaces 204, memory 210, and one or more communication buses 209 for interconnecting these components. The communication buses 209 may include circuitry (sometimes called a chipset) that interconnects and controls communications between system components. The server 102 optionally may include a user interface 205 comprising a display device 206 and input devices 208 (e.g., keyboard, mouse, touch screen, keypads, etc.). Memory 210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 210 may optionally include one or more storage devices remotely located from the CPU(s) 202. Memory 210, or alternately the non-volatile memory device(s) within memory 210, comprises a computer readable storage medium. In some embodiments, memory 210 stores the following programs, modules and data structures, or a subset thereof:

- an operating system 212 that includes procedures for handling various basic system services and for performing hardware dependent tasks;
- a communication module 214 that is used for connecting the server 102 to other computers via the one or more communication interfaces 204 (wired or wireless) and one or more communication networks, such as the Internet, other wide area networks, local area networks, metropolitan area networks, and so on;
- an optional user interface module 216 that receives commands from the user via the input devices 208 and generates user interface objects in the display device 206;
- a database module 218 that interfaces with databases in the server 102;
- the fusion and summarization engine 104, as described herein; and
- the state database 106, including presence states of persons 220, data from sensors 222, data from data sources 224, user preferences 226, registered data sources of persons 228, registered devices of persons 230, camera zones 232, and usage logs 234, as described herein.

Each of the above identified elements may be stored in one or more of the previously mentioned memory devices, and corresponds to a set of instructions for performing a function described above. The set of instructions can be executed by one or more processors (e.g., the CPUs 202). The above identified modules or programs (i.e., sets of instructions) need not be implemented as separate software programs, procedures or modules, and thus various subsets of these modules may be combined or otherwise re-arranged in various embodiments. In some embodiments, memory 210 may store a subset of the modules and data structures identified above. Furthermore, memory 210 may store additional modules and data structures not described above.

Although FIG. 2 shows a "server," FIG. 2 is intended more as a functional description of the various features which may be present in a set of servers than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers used to implement a server and how features are allocated among them will vary from one implementation to another, and may depend in part on the amount of data traffic that the system must handle during peak usage periods as well as during average usage periods.

Figure 3:
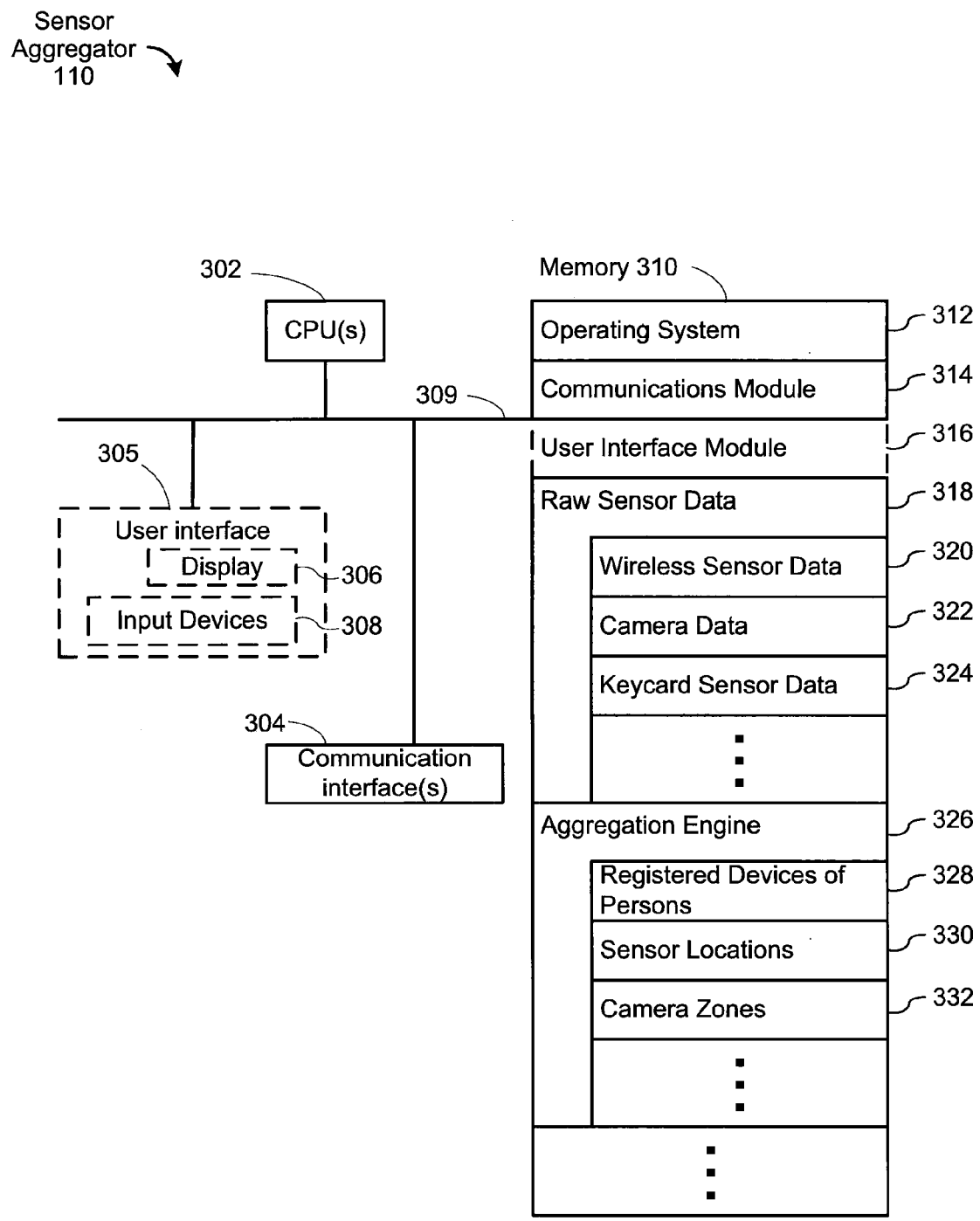
FIG. 3 is a block diagram illustrating a sensor aggregator, according to some embodiments.

FIG. 3 is a block diagram illustrating a sensor aggregator 110, according to some embodiments. The sensor aggregator 110 typically includes one or more processing units (CPU's) 302, one or more network or other communications interfaces 304, memory 310, and one or more communication buses 309 for interconnecting these components. The communication buses 309 may include circuitry (sometimes called a chipset) that interconnects and controls communications between system components. The sensor aggregator 110 optionally may include a user interface 305 comprising a display device 306 and input devices 308 (e.g., keyboard, mouse, touch screen, keypads, etc.). Memory 310 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices.

Memory 310 may optionally include one or more storage devices remotely located from the CPU(s) 302. Memory 310, or alternately the non-volatile memory device(s) within memory 310, comprises a computer readable storage medium. In some embodiments, memory 310 stores the following programs, modules and data structures, or a subset thereof:

- an operating system 312 that includes procedures for handling various basic system services and for performing hardware dependent tasks;
- a communication module 314 that is used for connecting the sensor aggregator 110 to computer systems and sensors via the one or more communication interfaces 304 (wired or wireless) and one or more communication networks, such as the Internet, other wide area networks, local area networks, metropolitan area networks, and so on;
- an optional user interface module 316 that receives commands from the user via the input devices 308 and generates user interface objects in the display device 306;
- raw sensor data 318 received from sensors (e.g., sensors in the sensor network 111) including wireless sensor data 320, camera data 322, and keycard sensor data 324; and
- an aggregation engine 326 that aggregates the raw sensor data 318 and provides the aggregated sensor data to the server 102, the aggregation engine 326 including data relating to registered devices of persons 328, sensor locations 330, and camera zones 332.

Each of the above identified elements may be stored in one or more of the previously mentioned memory devices, and corresponds to a set of instructions for performing a function described above. The set of instructions can be executed by one or more processors (e.g., the CPUs 302). The above identified modules or programs (i.e., sets of instructions) need not be implemented as separate software programs, procedures or modules, and thus various subsets of these modules may be combined or otherwise re-arranged in various embodiments. In some embodiments, memory 310 may store a subset of the modules and data structures identified above. Furthermore, memory 310 may store additional modules and data structures not described above.

Although FIG. 3 shows a "sensor aggregator," FIG. 3 is intended more as a functional description of the various features which may be present in a set of sensor aggregators than as a structural schematic of the embodiments described herein. In practice, and as recognized by those of ordinary skill in the art, items shown separately could be combined and some items could be separated.

Figure 4:
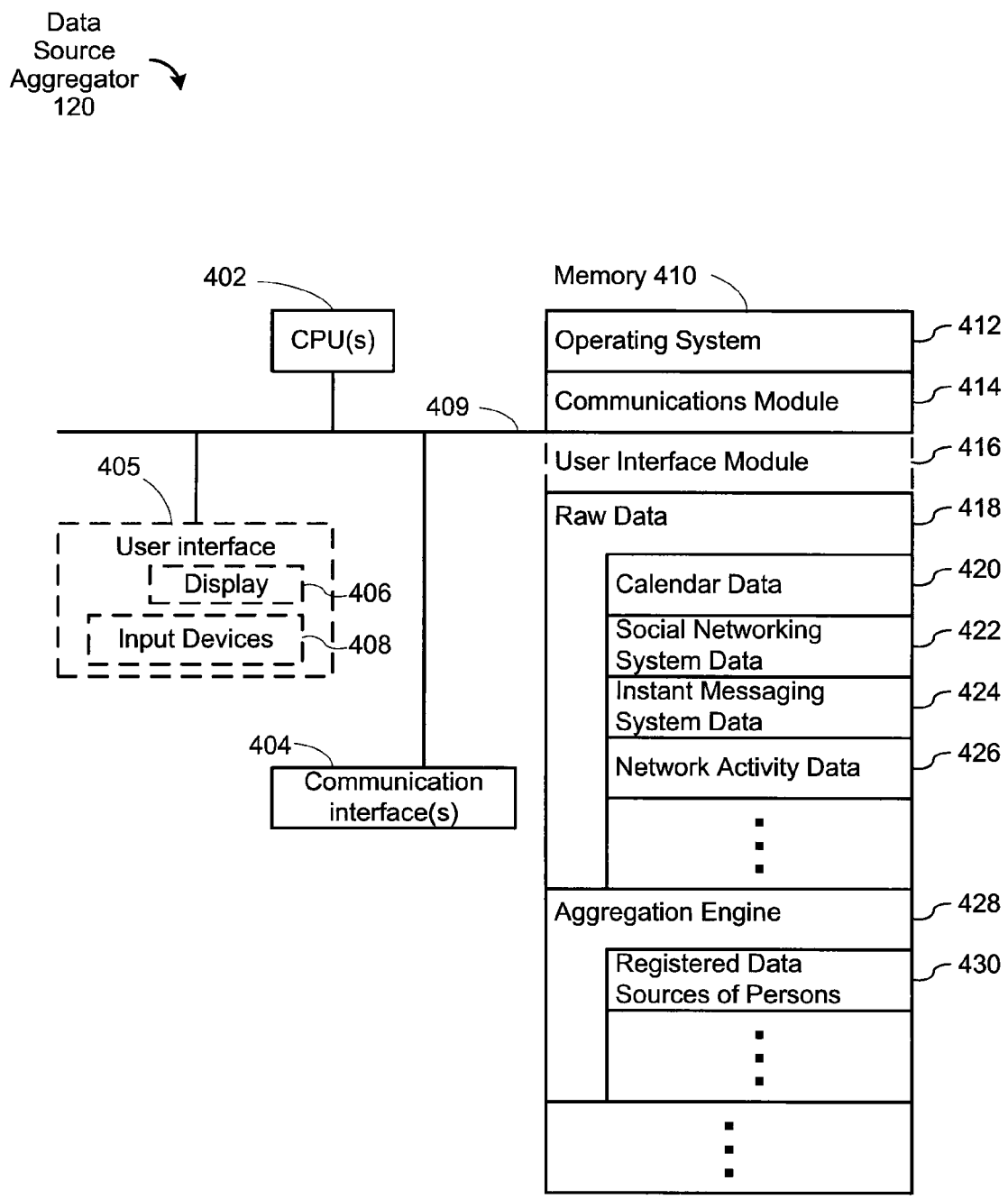
FIG. 4 is a block diagram illustrating a data source aggregator, according to some embodiments.

FIG. 4 is a block diagram illustrating a data source aggregator 120, according to some embodiments. The data source aggregator 120 typically includes one or more processing units (CPU's) 402, one or more network or other communications interfaces 404, memory 410, and one or more communication buses 409 for interconnecting these components. The communication buses 409 may include circuitry (sometimes called a chipset) that interconnects and controls communications between system components. The data source aggregator 120 optionally may include a user interface 405 comprising a display device 406 and input devices 408 (e.g., keyboard, mouse, touch screen, keypads, etc.). Memory 410 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 410 may optionally include one or more storage devices remotely located from the CPU(s) 402. Memory 410, or alternately the non-volatile memory device(s) within memory 410, comprises a computer readable storage medium. In some embodiments, memory 410 stores the following programs, modules and data structures, or a subset thereof:

- an operating system 412 that includes procedures for handling various basic system services and for performing hardware dependent tasks;
- a communication module 414 that is used for connecting the data source aggregator 120 to computer systems and data sources via the one or more communication interfaces 404 (wired or wireless) and one or more communication networks, such as the Internet, other wide area networks, local area networks, metropolitan area networks, and so on;
- an optional user interface module 416 that receives commands from the user via the input devices 408 and generates user interface objects in the display device 406;
- raw data 418 received from data sources (e.g., the external data sources 121), the raw data 418 including calendar data 420, social networking system data 422, instant messaging system data 424, and network activity data 426; and
- an aggregation engine 428 that aggregates the raw data 418 and provides the aggregated data to the server 102, the aggregation engine 428 including data relating to registered data sources of persons 430.

Each of the above identified elements may be stored in one or more of the previously mentioned memory devices, and corresponds to a set of instructions for performing a function described above. The set of instructions can be executed by one or more processors (e.g., the CPUs 402). The above identified modules or programs (i.e., sets of instructions) need not be implemented as separate software programs, procedures or modules, and thus various subsets of these modules may be combined or otherwise re-arranged in various embodiments. In some embodiments, memory 410 may store a subset of the modules and data structures identified above. Furthermore, memory 410 may store additional modules and data structures not described above.

Although FIG. 4 shows a "data source aggregator," FIG. 4 is intended more as a functional description of the various features which may be present in a set of data source aggregators than as a structural schematic of the embodiments described herein. In practice, and as recognized by those of ordinary skill in the art, items shown separately could be combined and some items could be separated.

Figure 5:
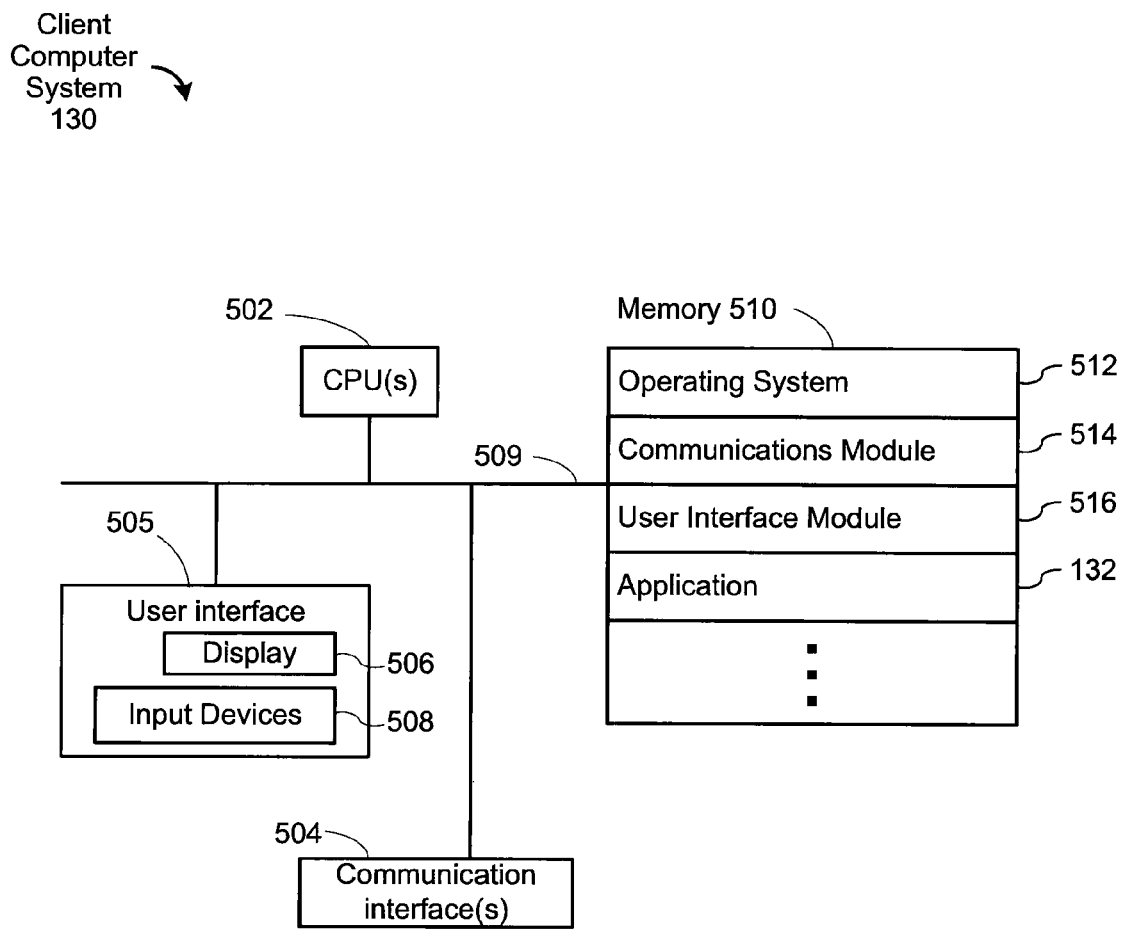
FIG. 5 is a block diagram illustrating a client computer system, according to some embodiments.

FIG. 5 is a block diagram illustrating a client computer system 130, according to some embodiments. The client computer system 130 typically includes one or more processing units (CPU's) 502, one or more network or other communications interfaces 504, memory 510, and one or more communication buses 509 for interconnecting these components. The communication buses 509 may include circuitry (sometimes called a chipset) that interconnects and controls communications between system components. The client computer system 130 also includes a user interface 505 comprising a display device 506 and input devices 508 (e.g., keyboard, mouse, touch screen, keypads, etc.). Memory 510 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 510 may optionally include one or more storage devices remotely located from the CPU(s) 502. Memory 510, or alternately the non-volatile memory device(s) within memory 510, comprises a computer readable storage medium. In some embodiments, memory 510 stores the following programs, modules and data structures, or a subset thereof:
- an operating system 512 that includes procedures for handling various basic system services and for performing hardware dependent tasks;
- a communication module 514 that is used for connecting the client computer system 130 to other computer systems via the one or more communication interfaces 504 (wired or wireless) and one or more communication networks, such as the Internet, other wide area networks, local area networks, metropolitan area networks, and so on;
- a user interface module 516 that receives commands from the user via the input devices 508 and generates user interface objects in the display device 506; and
- the application 132, as described herein.

Each of the above identified elements may be stored in one or more of the previously mentioned memory devices, and corresponds to a set of instructions for performing a function described above. The set of instructions can be executed by one or more processors (e.g., the CPUs 502). The above identified modules or programs (i.e., sets of instructions) need not be implemented as separate software programs, procedures or modules, and thus various subsets of these modules may be combined or otherwise re-arranged in various embodiments. In some embodiments, memory 510 may store a subset of the modules and data structures identified above. Furthermore, memory 510 may store additional modules and data structures not described above.

Although FIG. 5 shows a "client computer system," FIG. 5 is intended more as a functional description of the various features which may be present in a client computer system than as a structural schematic of the embodiments described herein. In practice, and as recognized by those of ordinary skill in the art, items shown separately could be combined and some items could be separated.

Determining Presence States of Persons

Figure 9:
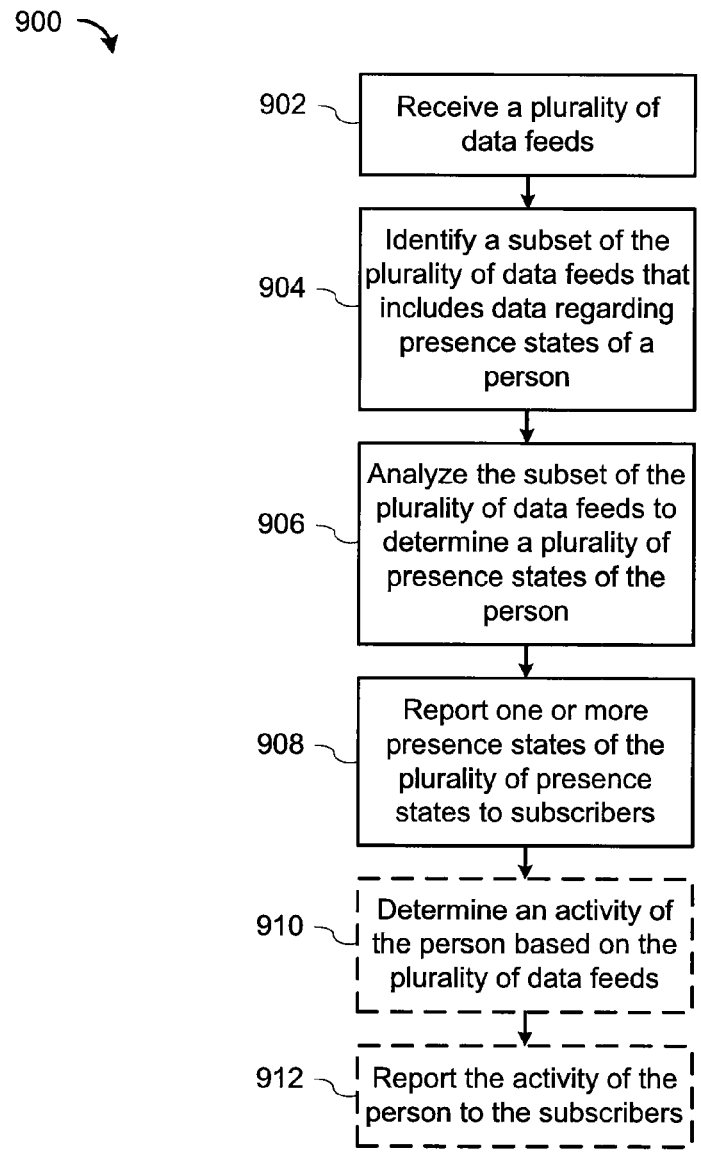
FIG. 9 is a flowchart of a method for determining a presence state of a person, according to some embodiments.

FIG. 9 is a flowchart of a method 900 for determining a presence state of a person, according to some embodiments. The fusion and summarization engine 104 receives (902) a plurality of data feeds, wherein a respective data feed in the plurality of data feeds includes data regarding respective presence states of persons. In some embodiments, the plurality of data feeds is received from the sensor aggregators 110 and/or the data source aggregators 120. In these embodiments, the data in the data feeds are first processed by the aggregators to produce aggregate data that is used by the fusion and summarization engine 104 to determine presence states of persons. In some embodiments, the plurality of data feeds can also be received directly from sensors in the sensor network 111 and/or the external data sources 121. In these embodiments, the fusion and summarization engine 104 uses the raw data from the sensor network 111 and/or the external data sources 121 to determine presence states of persons. In some embodiments, the respective data feed in the plurality of data feeds monitors the respective presence state only if the persons opt into allowing the respective data feed to monitor the respective presence states of the persons.

Next, the fusion and summarization engine 104 identifies (904) a subset of the plurality of data feeds that includes data regarding presence states of a person.

The fusion and summarization engine 104 then analyzes (906) the subset of the plurality of data feeds to determine a plurality of presence states of the person, wherein a respective presence state of the person is determined from a respective data feed in the subset of the plurality of data feeds.

In some embodiments, a video feed aggregator (e.g., a sensor aggregator 110) analyzes a video data feed to determine whether the person is in the office, a visitor is in the office of the person, or the person is not in the office. In some embodiments, the video feed aggregator determines whether the person is in the office by determining whether the video data feed includes movement in a user-defined zone typically occupied by the person when the person is in the office. In some embodiments, the video feed aggregator determines whether a visitor is in the office of the person by determining whether the video data feed includes movement in a user-defined zone typically occupied by a visitor when a visitor is in the office. In some embodiments, the video feed aggregator determines whether the person is not in the office by determining whether the video data feed does not include movement. The video data aggregator provides an aggregate video data feed including data about whether the person is in the office, a visitor is in the office of the person, or the person is not in the office to the fusion and summarization engine 104.

In some embodiments, a wireless sensor feed aggregator (e.g., a sensor aggregator 110) analyzes a wireless data feed to determine a respective presence state of the person by analyzing the wireless data feed to determine whether a wireless device registered to the person is within range of a wireless sensor.

In some embodiments, a keycard sensor feed aggregator (e.g., a sensor aggregator 110) analyzes a keycard data feed to determine a respective presence state of the person by analyzing the keycard data feed to determine whether a keycard registered to the person was used at a keycard sensor.

In some embodiments, a calendar data aggregator (e.g., a data source aggregator 120) analyzes a calendar data feed to determine a respective presence state of the person by analyzing the calendar data feed to determine whether the person is at an appointment.

In some embodiments, a status data aggregator (e.g., a data source aggregator 120) analyzes a user-updated status data feed to determine a respective presence state of the person by analyzing the user-updated status data feed to determine the current status of the person.

In some embodiments, a network activity data aggregator (e.g., a data source aggregator 120) analyzes a network data feed to determine a respective presence state of the person by analyzing the network data feed to determine whether a network device registered to the person is being actively used on the network. In some embodiments, the network activity data aggregator analyzes the network data feed to determine a location at which the network device is being used. For example, the location may be in an office building, a home, or a public building.

Returning to FIG. 9, the fusion and summarization engine 104 reports (908) one or more presence states of the plurality of presence states to subscribers via the network. For example, consider two data feeds that include data regarding the presence states of a person, where a first data feed indicates that the person is using the person's computer and the second data feed indicates the person is connected to the corporate network remotely (e.g., outside of the corporate LAN). The fusion and summarization engine 104 may report a single presence state of the person (e.g., from one of the two data feeds) or combine two or more presence states of the person to provide a higher level of specificity as to the presence state of the person (e.g., the person is using the person's computer to remotely connect to the corporate LAN). The manner in which the fusion and summarization engine 104 reports the presence state of the person may be configured by an administrator. For example, the administrator may designate data feeds that may be combined (and a hierarchy of combinations in cases where only one combination is to be reported). Note that the fusion and summarization engine 104 may also allow an end user to configure the manner in which the fusion and summarization engine 104 reports the presence state of the person. In some embodiments, fusion and summarization engine 104 selects one or more presence states of the person that provides the highest levels of specificity as to the presence states of the person. For example, when reporting more than one presence state of the person, the presence states selected by the fusion and summarization engine 104 are the presence states with the highest levels of specificity (e.g., the most detail or the greatest resolution). The hierarchy of the levels of specificity may be configured by an administrator or an end user. In some embodiments, the subscribers are members of an organization (e.g., a company, an office, or a household).

In some embodiments, the one or more presence states are selected from the group consisting of: real-time presence states and historical presence states. In embodiments where real-time presence states are reported, the fusion and summarization engine 104 processes real-time data received from the plurality of data feeds. In embodiments where historical presence states are reported, the fusion and summarization engine 104 reports previously-determined presence states that are stored in the state database 106.

In some embodiments, only one of the plurality of presence states for the person is reported, specifically the presence state for the person that has the highest level of specificity as to the presence state of the person.

In some embodiments, when the presence state of the person is below a predetermined level of specificity, the fusion and summarization engine 104 reports a last-known presence state of the person that is above the predetermined level of specificity and a time at which the last-known presence state was determined.

In some embodiments, the presence state of the person and a plurality of other subscribers are displayed in a user interface of an application on a client computer system of a respective subscriber (e.g., the user interface 602 for the application 132).

In some embodiments, the presence state of the person includes a location and an activity of the person. A location describes the physical location of the person and an activity describes what the person is doing (e.g., in a meeting, working on a particular project, or out to lunch). In these embodiments, the fusion and summarization engine 104 determines (910) an activity of the person based on the plurality of data feeds and reports (912) the activity of the person to the subscribers. In some embodiments, the fusion and summarization engine 104 determines the activity of the person based on one or more of: an appointment obtained from one or more calendars, a user-updated status from an application that reports the status of subscribers (e.g., the application 132), a user-updated status from an instant messaging system, and a user-updated status from a social networking system.

In some embodiments, the one or more presence states of the person are determined using an algorithm selected from the group consisting of rule-based algorithms and statistical and probabilistic modeling algorithms.

Figure 10:
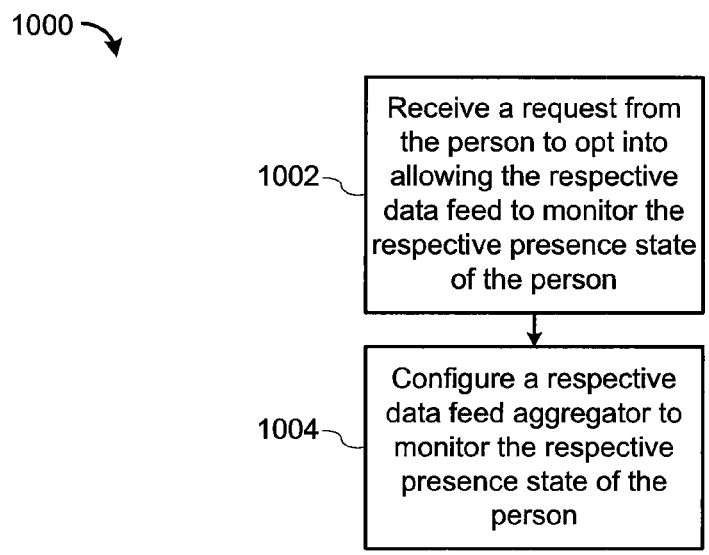
FIG. 10 is a flowchart of a method for configuring a data feed aggregator to monitor a presence state of a person, according to some embodiments.

Note that the embodiments described herein are not meant to track persons, but are instead used to provide group awareness of the availability of persons. Accordingly, some embodiments allow persons to opt into allowing data feeds to monitor the presence states of the person. FIG. 10 is a flowchart of a method 1000 for configuring a data feed aggregator to monitor a presence state of a person, according to some embodiments. The server 102 receives (1002) a request from the person to opt into allowing the respective data feed to monitor the respective presence state of the person. In some embodiments, the server 102 receives (1002) a request from an administrator to opt into allowing the respective data feed to monitor the respective presence state of the person. In some embodiments, the respective data feed is received from a respective physical sensor, and the request from the person (or the administrator) includes a respective device identifier for a respective device of the person that is to be monitored by the respective data feed. In these embodiments, the server 102 associates the device identifier for the device with the person and stores this information in the registered devices of persons 230. In some embodiments, the respective data feed is received from a respective data source, and the request from the person (or the administrator) includes a respective data source identifier of the person that is to be monitored by the respective data feed. In these embodiments, the server 102 associates the data source identifier for the data source with the person and stores this information in the registered data sources of persons 228.

The server 102 then configures (1004) a respective data feed aggregator to monitor the respective presence state of the person. For example, the server 102 transmits information about the registered devices of persons 230 to the sensor aggregators 110 to be stored as the registered devices of persons 328. Similarly, the server 102 may transmit information about the registered data sources of persons 228 to the data source aggregators 120 to be stored as the registered data sources of persons 430.

Figure 7:
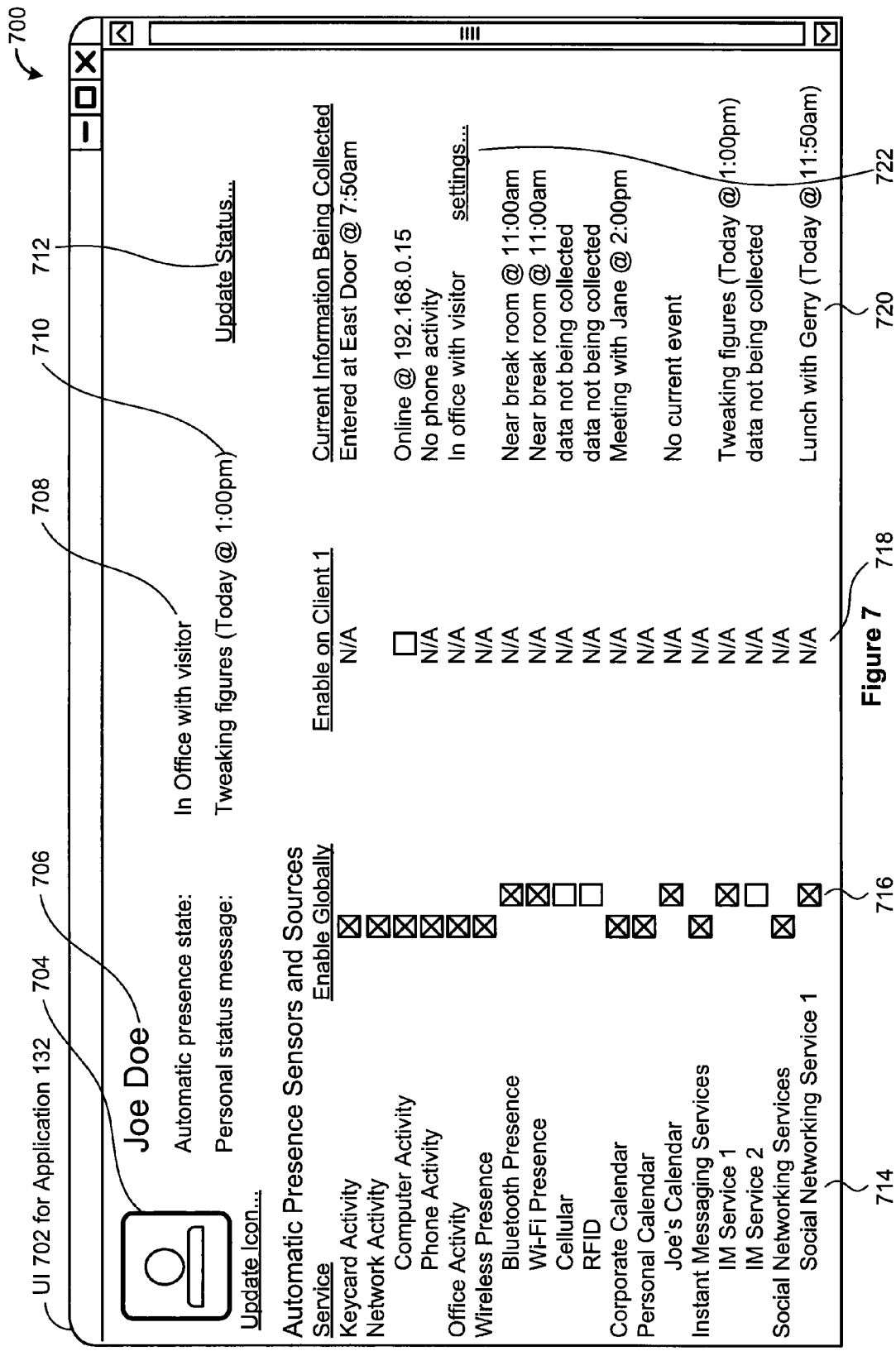
FIG. 7 is a block diagram illustrating a user interface of an application that allows a person to opt into allowing data feeds to monitor the presence state of the person, according to some embodiments.

FIG. 7 is a block diagram 700 illustrating user interface 702 of the application 132 that allows a person to opt into allowing data feeds to monitor the presence state of the person, according to some embodiments. The user interface 702 of the application 132 includes a photo 704 of the person, the name 706 of the person, a presence state 708 of the person (e.g., as determined by the fusion and summarization engine 104), and a status message 710 that was entered by the person using the user interface 602 for the application 132 and/or using the "Update Status" link 712. The user interface 702 for the application 132 allows the person to enable or disable services 714 that monitor the presence state of the person (e.g., the data feeds) by checking or unchecking checkboxes 716 (globally enable) and checkboxes 718 (enabled for particular devices). The user interface 702 for the application 132 also displays the current information being collected by the services 720. The person may use the "settings" link 722 to invoke a tool that allows the person to define zones of the person's office workspace that indicate whether the person is in the office, the person is in the office with a visitor, or the person is not in the office (e.g., see FIG. 8).

The methods 900 and 1000 may be governed by instructions that are stored in a computer readable storage medium and that are executed by one or more processors of one or more servers. Each of the operations shown in FIGS. 9 and 10 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted and/or executable by one or more processors.

Nudge and Ping Functionality

The modern workplace is becoming increasingly more distributed and mobile. In today's organizations, it is not uncommon for employees working on the same team or project to be scattered all over the world, across different time zones and cultures, working irregular or extended work hours. While there are many modern tools for enabling communication across distances (e.g., phone, email, and instant messaging), these tools by themselves lack the ability to assist in initiating contact. That is, these tools still require workers to determine the availability, appropriateness, and utility of a chosen communication channel and when to use it.

Simple impediments such as knowing if a co-worker is available to communicate, where that coworker is located, and what communication channels are available hinder and often prevent communication. Recent research has shown that these deficiencies have dramatic impact on workers' ability to successfully collaborate. A consistent result is that casual, impromptu interactions rarely occur between workers who are not co-located. Since these types of exchanges have been shown to be predominant and important in collaborative creativity and problem solving, this result is of concern.

Current technological support for helping workers to initiate collaboration is significantly lacking. Most existing technology is limited to providing a single channel of presence or state. For instance, many instant messaging (IM) clients provide details about whether or not a worker is active inside the particular communication tool. Other systems, such as FXPAL's MyUnity system, provide multiple levels and sources of awareness information that allow workers to be more informed before initiating communication. However, these systems also lack direct facilities to help workers initiate and foster communication among peers.

In some embodiments, the deficiencies in existing electronic-mediated communication are addressed by providing a system and method to allow workers to easily and naturally initiate communication. Some embodiments include two new structured interaction models: the Ping and the Nudge. The Ping allows workers to provide peers with short, push-style messages that provide timely context-related information about a person's availability or state. The Nudge provides a structure for a negotiation to choose when and on what channel to initiate communication. Some embodiments combine the new structured Ping and Nudge interaction models with the information and features provided by existing multi-channel awareness tools, e.g. FXPAL's MyUnity system, which is described above with respect to FIGS. 1-10.

Embodiments can be configured to run on computers of several different form factors: including on a traditional desktop computer, on a laptop, and/or on a mobile smart phone. In some embodiments of the mobile smart phone form factor, additional functionality is integrated into the functions of this device. We describe some smartphone-specific features below. An advantage of the structured interaction models employed in some embodiments is that such models simplify communications on devices with small screens and limited user input capabilities (when compared to desktop or laptop computers, for example). An illustrative embodiment is now described with reference to FIG. 13.

Figure 13:
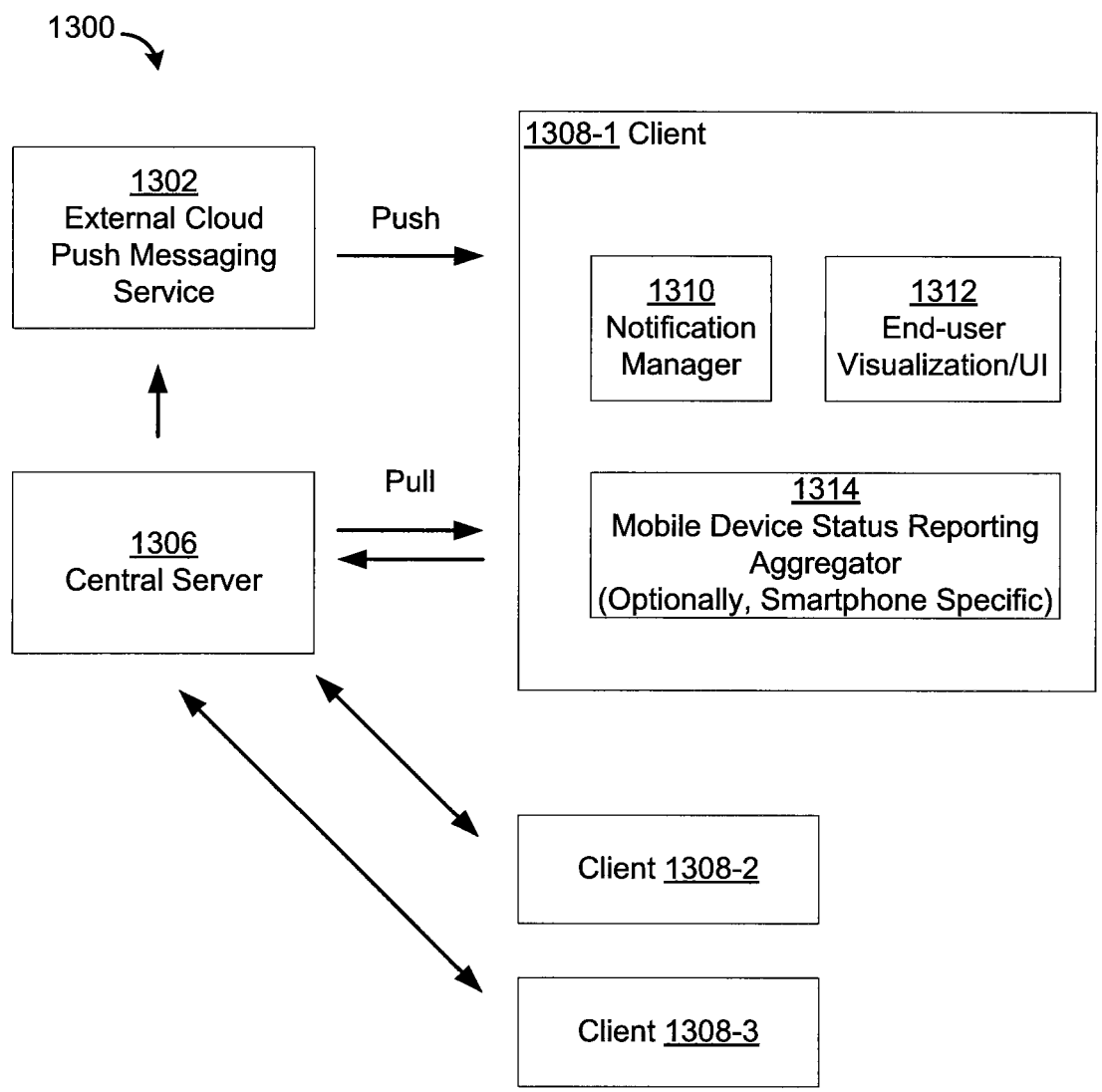
FIG. 13 is a block diagram of an illustrative embodiment of a system and method for coordinating communication events using computer-assisted structured interaction.

FIG. 13 shows a block diagram of an illustrative embodiment 1300 of a system for coordinating communication events using Ping and Nudge functionality. The system 1300 includes an external cloud push messaging service 1302, a central server 1306 and one or more clients 1308 (e.g., 1308-1, 1308-2, and 1308-3).

A client 1308 can be any type of client device configured to perform the Ping and/or Nudge functionality described herein, and in some embodiments, one or more additional features of the client application 132 as described above with respect to FIGS. 1-10. For example, a client 1308 can be a laptop or desktop computer, a smart phone, or similar computing device. A representative client 1308 includes one or more of a notification manager 1310, an end-user visualization/UI module 1312 and a mobile device status reporting aggregator 1314 (which is used with clients that are mobile devices, such as smart phones), which we discuss in turn below. As shown in FIG. 13, clients 1308 can communicate with each other and other system components through push interactions with the external cloud push messaging service 1302 (a conventional message service that forwards messages sent by a client 1308) and via pull interactions with the central server 1302 (which in some embodiments corresponds to the server 102 of FIG. 1). In addition to the push and pull messages, clients 1308 are configured to exchange messages with the server 1306 that are related to other aspects of system and client operations. For example, a client 1308 can exchange with the server 1306 preferred settings for mediums of communication for the user of the client user based on time of day and/or user location (both of which can be derived from presence information determined automatically for the user using the MyUnity system). Additional details are now provided for the individual components of the system 1300.

End-User Visualization/UI Module 1312: In some embodiments, the end-user visualization/user interface builds on features already present in existing multi-channel awareness tools (e.g., MyUnity), which are described above with reference to FIGS. 1-10. Among other functions, the end-user visualization/UI module 1312 generates and displays user interfaces associated with the Ping and Nudge operations described herein and enables user interaction with elements of the displayed user interfaces. In some embodiments, these user interactions can be via a keyboard, a pointing device, such as a mouse, or a touch-sensitive interface. In the following sections, we describe the additional interactions, features, and visual elements that support the extended system and methods of the current invention. Many of these interactions, features and visual elements are also illustrated and described below with reference to exemplary screenshots, which are generated by the end-user visualization/UI module 1312.

Ping: A Ping is a structured notification that is sent from a user to one or more recipient users; in some embodiments, without facilities to carry out further communication. A Ping is commonly used to send updated location, status or availability information for a user, which can assist other system users to plan and/or request an interaction. A Ping is associated with an initiator and a receiver, both of whom are users of respective clients 1308.

- Initiator: The initiator of a Ping sees a simple interface that allows them to choose from a predefined list of reasons that they are sending the Ping, specify urgency, and include further free-text.
- Receiver: Each receiver of a Ping is shown a representation of the content that the initiator expressed during notification creation. In some embodiments, the current awareness and presence details for the initiator are also shown.

Nudge: A Nudge is a thread of structured notifications between two or more parties aimed at negotiating an acceptable time and medium for communication. In some embodiments, the difference between a Nudge and a Ping includes that the Nudge is associated with the expectation that the receiver of the Nudge will respond, and that there will be further communication beyond the Nudge (e.g., communication at the accepted time using the accepted medium). A Nudge is associated with an initiator and a receiver, which are now described in terms of basic and optional functionality associated with some embodiments.

Initiator (basic): The initiator of a Nudge sees an interface that allows him or her to specify specific aspects of the nature of his/her communication request, including: their preferred and acceptable media for communication, the priority of the interaction (e.g. ASAP, any time), and the deadline for communication, if one exists. In some embodiments, the media for communication include phone (any sort—e.g., mobile, landline or VoIP software-based), email, short message service (SMS), instant messaging (IM) or video chat.

Receiver (basic): The receiver of a Nudge sees a structured notification generated from the content that the initiator expressed during notification creation. In some embodiments, awareness and presence information for the initiator is also shown. The receiver of a Nudge has the option to immediately initiate communication with the initiator, send a response, or ignore the notification. If a response is sent, it includes information of media that are acceptable to the receiver for communication and when the receiver of the Nudge is available through those media. In some embodiments, when responding with his or her choice of media or time of the communication, the receiver of the Nudge is limited to the ones specified by the initiator, or a subset thereof (selected by the receiver from among the initiator's choices of time and medium).

Initiator (optional): In some embodiments, in response to the receiver's sending a response, the initiator optionally sees the response and is then allowed to choose between/among the options proposed by the receiver. The initiator is then allowed to set a reminder for himself/herself.

Receiver (optional): In some embodiments, in response to the initiator's choice of an option between/among the options proposed by the receiver, the receiver is optionally sent a notification informing him or her of the initiator's choice and is allowed to set a reminder.

Communication Reminder/Alert/Calendar Event: A communication reminder or alert can be set automatically during a Nudge or Ping, or manually by a user. The alert can be specified by certain rules. This could be time-based, or in some embodiments, combined with the awareness information and rules based on awareness/presence state (for example, "Call Jane Doe after 2 pm when she is no longer 'In Meeting'"). When an alert fires, the person's awareness/presence information is displayed along with the alert. All parties can also choose to add the agreed-upon communication to their calendar from within a Nudge or a Ping. In some embodiments, the communication reminders/alerts are displayed in a client 1308 under control of an end-user visualization/UI module 1312.

Preemptive Status: In some embodiments, a user is enabled to specify his or her communications conditions ahead of time, either explicitly or using a rule-based approach. For example, a user may go into a meeting, and preemptively specify their communication media as follows: "reachable by IM or email during meeting," or "phone after 2:00 pm," or they could simply say "force all communication through 'Nudge'" and initiators of communication would be directed to the appropriate action. In some embodiments, a response to a Nudge notification is automatically generated based at least on a presence state of the user (e.g., a response may include "in a meeting"). In some embodiments, the response to a notification is generated automatically based at least on a self-reported state of a user. In some embodiments, the response is automatically generated further based on one or more rules defined by the user (e.g., "reachable by IM or email during meeting"). Thus, in some embodiments, times/mediums not conforming to the one or more rules are automatically rejected (e.g., a "no agreeable option" message is sent). In some embodiments, the rules are based on a respective class of an initiator. Thus, the one or more rules are configured to process requests from respective classes of users (e.g., notifications from "co-workers" and notifications from "friends" may be processed differently). In some embodiments, the one or more rules include rejecting requests from a first class of users (e.g., notifications from "friends" may be rejected while the receiving user is in a critical meeting). In some embodiments, these user settings/conditions are stored as user preferences at the server 1306.

Audio/Voicemail interface for non-users: In some embodiments, people that attempt to contact the user when they are unavailable have the option of being directed to a phone audio menu that allows them to express content similar to that expressed in the Ping and Nudge, or to request a link to a web interface to perform these actions.

Web interface for non-users: Non-users have the option of initiating communication through a Nudge or a Ping in a web format. Users may navigate to this page on their own, or be referred to it when they have tried some other communication method.

Incoming calls (smartphone specific): When a user receives an incoming call, the presence information of the caller is displayed to the receiver on the same screen as the call/hang-up options. A person receiving a call has the option to "request a Nudge" either implicitly or explicitly if a call is rejected, or on a more general rule-based scale as specified by preemptive status above.

Outgoing calls (smartphone specific): When an outgoing call is being made, the presence information of the user being called is displayed to the caller. If an outgoing call fails, the user is given the option of sending a Nudge or Ping after the failed call.

Notification Manager 1310: In some embodiments, all end-user devices that are registered to a user receive notification from the server. In some embodiments, a subset of the devices that are registered to the user receives the notification from the server. In such embodiments, a notification is transmitted to at least a subset of devices registered to the user. The receiving devices alert the user according to his/her pre-defined settings, which may include audio, tactile, and/or visual notification. Notifications can depend on the structure of exchanged notification (explained further in the following section) (e.g., "waiting for you" is more urgent than "free to talk") which can be set automatically using intelligent defaults like the one above or explicitly from the expressed urgency of individual Pings and Nudges. Both explicit rule expressions, such as "no audio/tactile notification is necessary," and more flexible contextual expression, such as "it can wait until the meeting is over," are acceptable. Both the receiver and the initiator can specify how they want these notifications to be handled. For example, a receiver can express the rule "don't bother me during meetings unless it's something with a deadline before the meeting is over".

Mobile Device Status Reporting Aggregator (optionally, smartphone specific) 1314: This module reports status information pertaining to a user's particular mobile device, including the call state of the phone (e.g., in call, ringing, idle) and a representation of the location of the phone. This information could be specific GPS coordinates or predefined locations encoded in structured semantic meaning, for instance, "Work" or "Home." Users can also choose to report their location only at specific locations and/or times, for instance, only relaying location when at a work facility.

Central Server 1302: This is a networked application server which mediates the sending of a structured interaction notification (Ping or Nudge) thread between the communicating parties. Communication may be initiated from any end-user device, such as a mobile device, a laptop, or a desktop computer. The notification is delivered in a 'push' methodology to one or more users and to one or more devices per user, depending on their personally defined preferences. Once a notification has been cleared on one device, the notification server informs a user's other devices to prevent multiple-delivery. Push messaging is facilitated by a suitable service, which can be internal or external, and ensures timely delivery of messages to the device.

Nudge and Ping Dialogs and User Interaction

Figure 14:
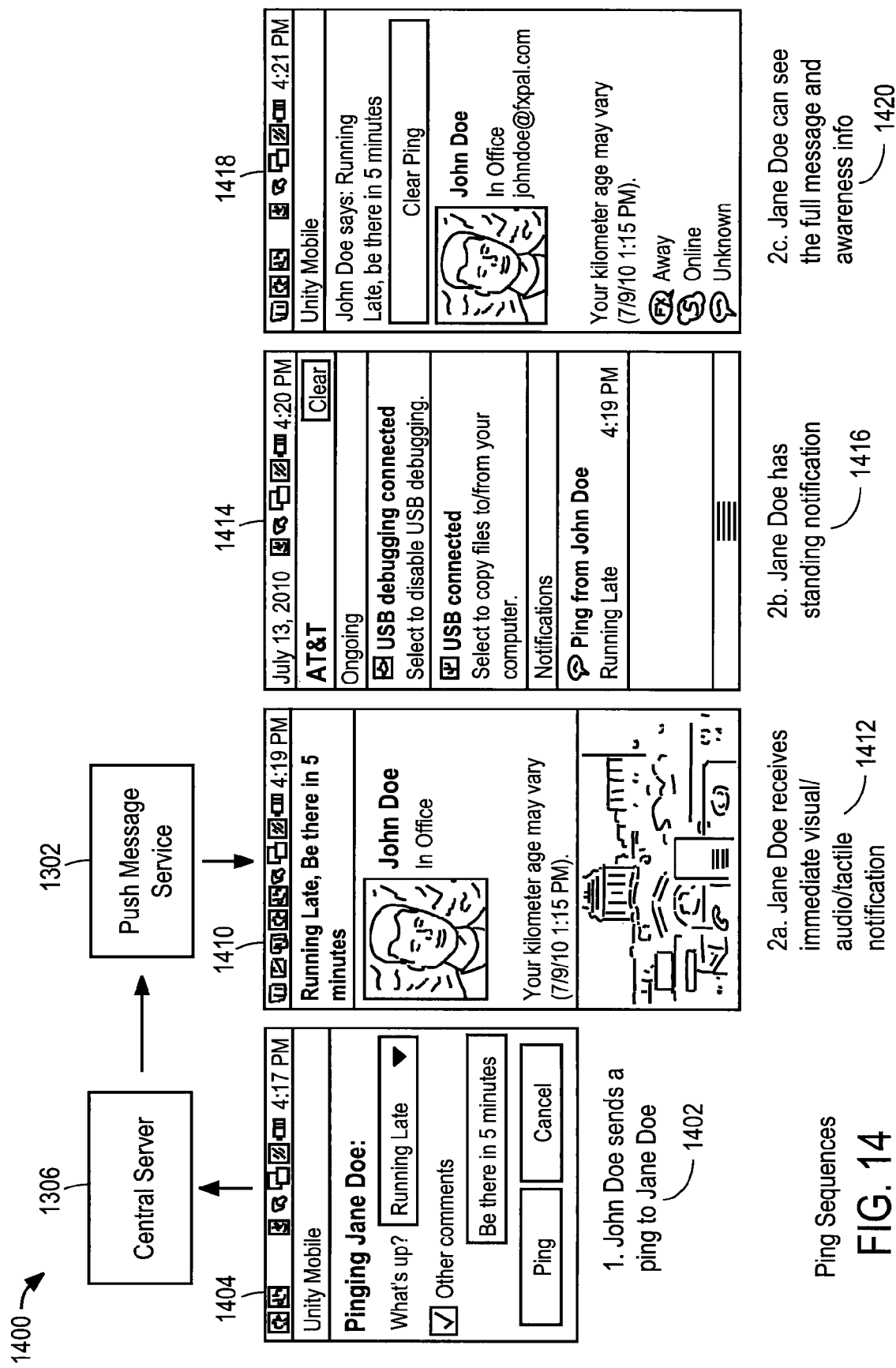
FIG. 14 is a series of exemplary screenshots that illustrate a sequence of system operations associated with a Ping.
Figure 15:
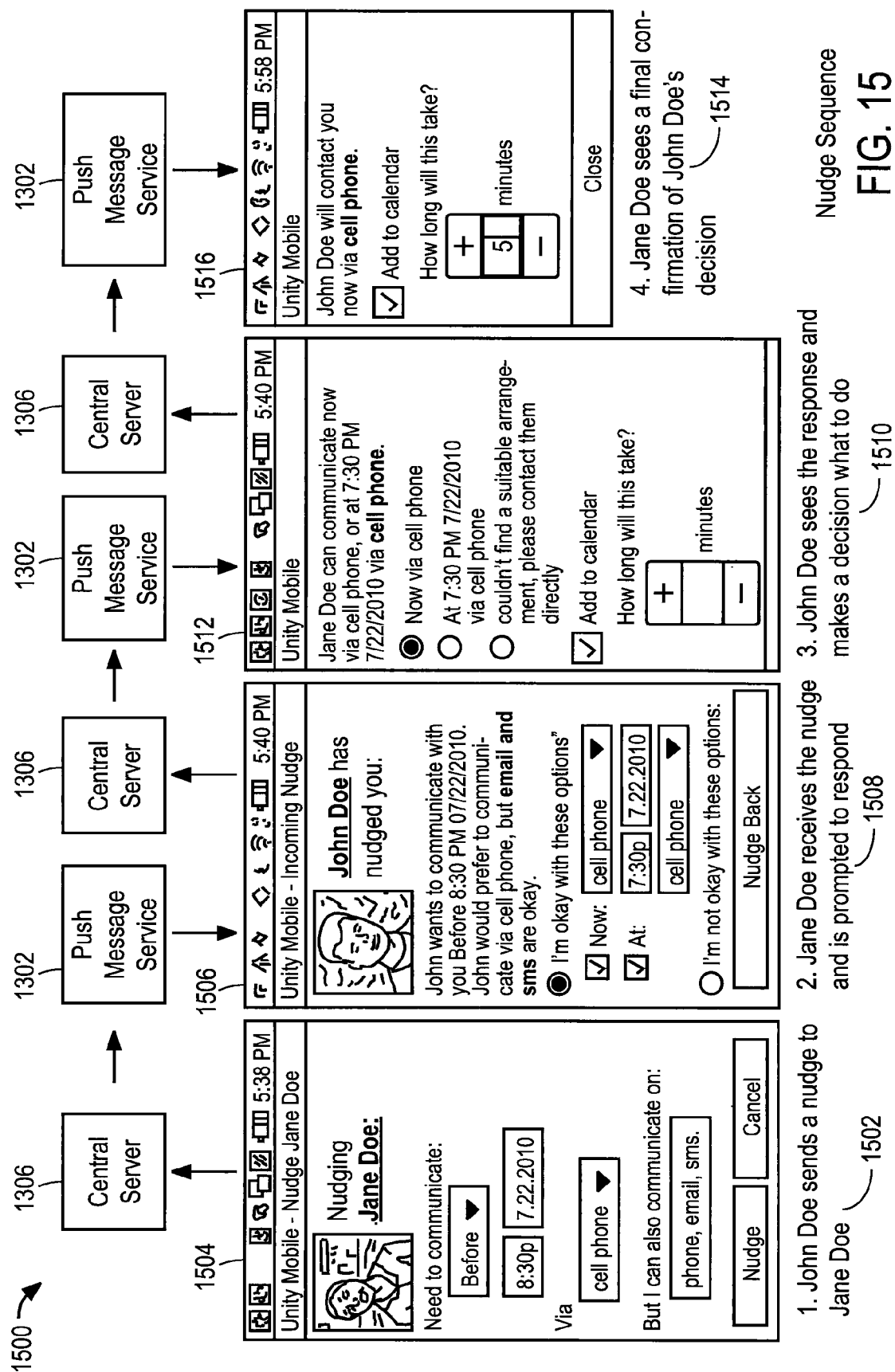
FIG. 15 is a series of exemplary screenshots that illustrate a sequence of system operations associated with a Nudge.

As described above, FIG. 13 provides a high-level view of how components of some embodiments interact. FIGS. 14 and 15 provide an overview of the structured user dialogs (program interfaces) that end-users see and interact with from a client 1308 when using the system. In particular, FIG. 14 includes a series of exemplary screenshots that illustrate a sequence of system operations associated with a Ping, and FIG. 15 includes a series of exemplary screenshots that illustrate a sequence of system operations associated with a Nudge.

Referring to FIG. 14, a first user (e.g., John Doe) sends a Ping 1402 to a second user (e.g., Jane Doe) employing a structured user dialog 1404 displayed on a display screen of a client device 1308-1 associated with the first user (e.g., John Doe). In the exemplary dialog 1404, the Ping notes that the first user (e.g., John Doe) is "Running Late" (selected from a number of preset options) and additionally notes that the first user (e.g., John Doe) will "Be there in 5 minutes" (this "other comment" could be selected from a number of preset options or could be entered by the first user (e.g., John Doe)). This use of structured dialogs, which provide preset, selectable messages appropriate for different situations, allows users to send Pings (and Nudges) quickly from small devices, such as mobile smart phones.

In this illustration, the first user (e.g., John Doe) selects "Ping" 1405 from the dialog 1404, which causes the client 1308-1 to send a message to the push message service 1302 via the central server 1306. The push message service 1302 then pushes the Ping message to a client device 1308-2 associated with the second user (e.g., Jane Doe), which displays the associated screen 1410, providing the second user (e.g., Jane Doe) with immediate visual, audio, and/or tactile notification 1412 of the Ping. Having received the Ping, the second user (e.g., Jane Doe) retains a standing notification 1414 in an inbox of the Ping from the first user (e.g., John Doe) (e.g., "Ping from John Doe" is listed as an inbox "Notification"). In some embodiments, the second user (e.g., Jane Doe) can see on a screen 1418 the full message along with awareness/presence information 1420 for the first user (e.g., John Doe). This awareness/presence information can be the same as that described with reference to the systems and methods of FIGS. 1-10. For example, the screen 1418 notes that John Doe is "In Office," which information can be obtained from the "MyUnity" system. This is just one example of the many ways in which presence information can be integrated with Nudge and Ping functionality.

Referring to FIG. 15, the first user (e.g., John Doe) sends a Nudge 1502 to the second user (e.g., Jane Doe) employing a structured user dialog 1504 displayed on a display screen of a client device 1308-1 associated with the first user (e.g., John Doe). In the exemplary dialog 1504, the Nudge is being used by the first user (e.g., John Doe) to set up a meeting via "phone" with the second user (e.g., Jane Doe) "before 8:30 pm on Jul. 22, 2010." The Nudge screen also notes that, while phone is the preferred medium for the meeting, the full set of acceptable mediums include phone, email and SMS (text messaging).

In this illustration, the first user (e.g., John Doe) selects "Nudge" 1505 from the dialog 1504, which causes the client 1308-1 to send a message to the push message service 1302 via the central server 1306. The push message service 1302 then pushes the Nudge message to a client device 1308-2 associated with the second user (e.g., Jane Doe), which displays the associated screen 1506, providing the second user (e.g., Jane Doe) with information associated with the Nudge, and prompting the second user (e.g., Jane Doe) to respond 1508. The second user (e.g., Jane Doe) can reply to the Nudge with a message sent back to the first user (e.g., John Doe) via the central server 1306 and the push message service 1302. In this example, the second user (e.g., Jane Doe) replies that she prefers to meet "now" via "cell phone," or at "7:30 pm on Jul. 22, 2010 via cell phone." Note that the structured response dialog 1506 provides options for response that are consistent with those in the original Nudge. For example, in the interest of the two users converging on a meeting time and medium, the second user (the receiver of the Nudge) (e.g., Jane Doe) can only select from the communication media proposed by the first user (e.g., John Doe). The second user (e.g., Jane Doe) can reply that she wants to employ a medium other than the first user's preferred medium, but can't suggest other options beyond the acceptable media identified by the first user (e.g., John Doe). The times in the response 1506 are also consistent with the proposed meeting time "Before 8:30" from the Nudge 1504.

Subsequently, the first user (e.g., John Doe) receives the reply from the second user (e.g., Jane Doe) and sends a further reply to the second user (e.g., Jane Doe) using the reply dialog 1512. In this reply dialog, the first user (e.g., John Doe) notes by selecting from among the options in the second user's prior message whether she is available to meet "now via cell phone" or at "7:30 via cell phone." The reply dialog also includes additional options, such as the option, "couldn't find a suitable arrangement, please contact them directly," and structured options to allow the first user (e.g., John Doe) to add the agreed-on meeting to his calendar, and to specify how long the meeting will take in minutes. The first user (e.g., John Doe) sends his reply 1512 to the second user (e.g., Jane Doe) via the central server 1306 and the push message service 1302. In this example, the reply by the first user indicates that the first user (e.g., John Doe) will contact the second user (e.g., Jane Doe) now via cell phone.

The second user (e.g., Jane Doe) then receives the first user's confirmation 1514 on a confirmation dialog 1516 that the first user (e.g., John Doe) will call the second user (e.g., Jane Doe) now, via cell phone. The confirmation dialog 1516 allows the second user (e.g., Jane Doe) to add the meeting to her calendar (via a check box) and also can confirm that the meeting will take 5 minutes.

Note that the Nudge example described with respect to FIG. 15 employs structured dialogs that enable users to efficiently converge/agree on a meeting time and communication medium. This is due in part to the fact that these structured dialogs allow users to select from feasible and/or pre-defined alternatives, including alternatives that the individual users have defined as acceptable, or alternatives that are based on presence or awareness information for the user. The efficiency of this method is also due to the fact that in some embodiments recipients are restricted to working with options for time and communication medium from the set originally sent by the first sender, which promotes quick agreement as contrasted with protracted negotiations over meeting time and communication medium.

Figure 16:
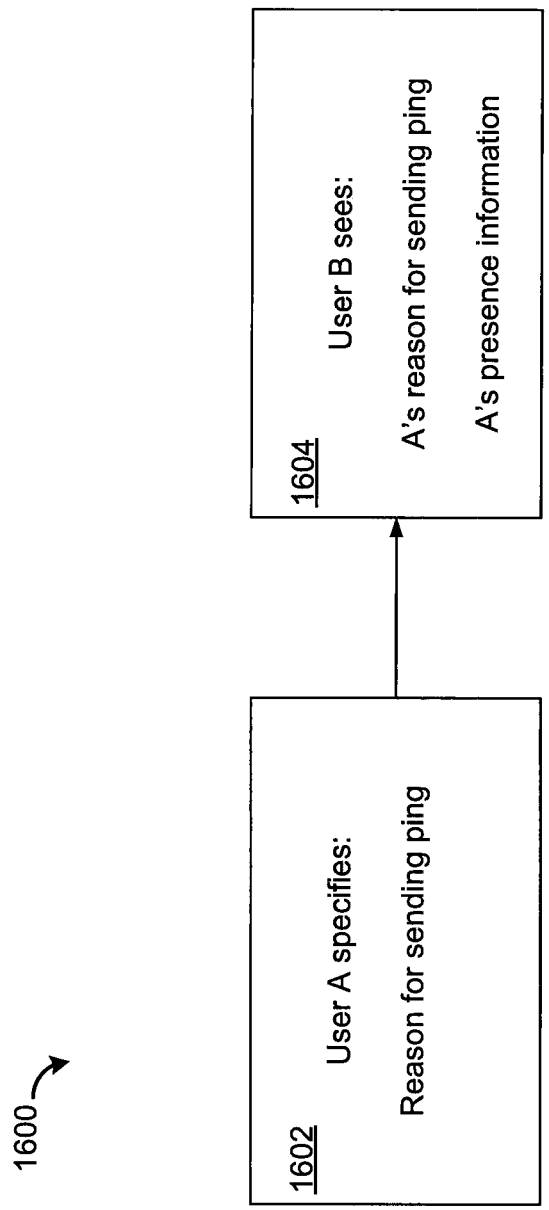
FIG. 16 is a flowchart illustrating steps in an exemplary Ping sequence.
Figure 17:
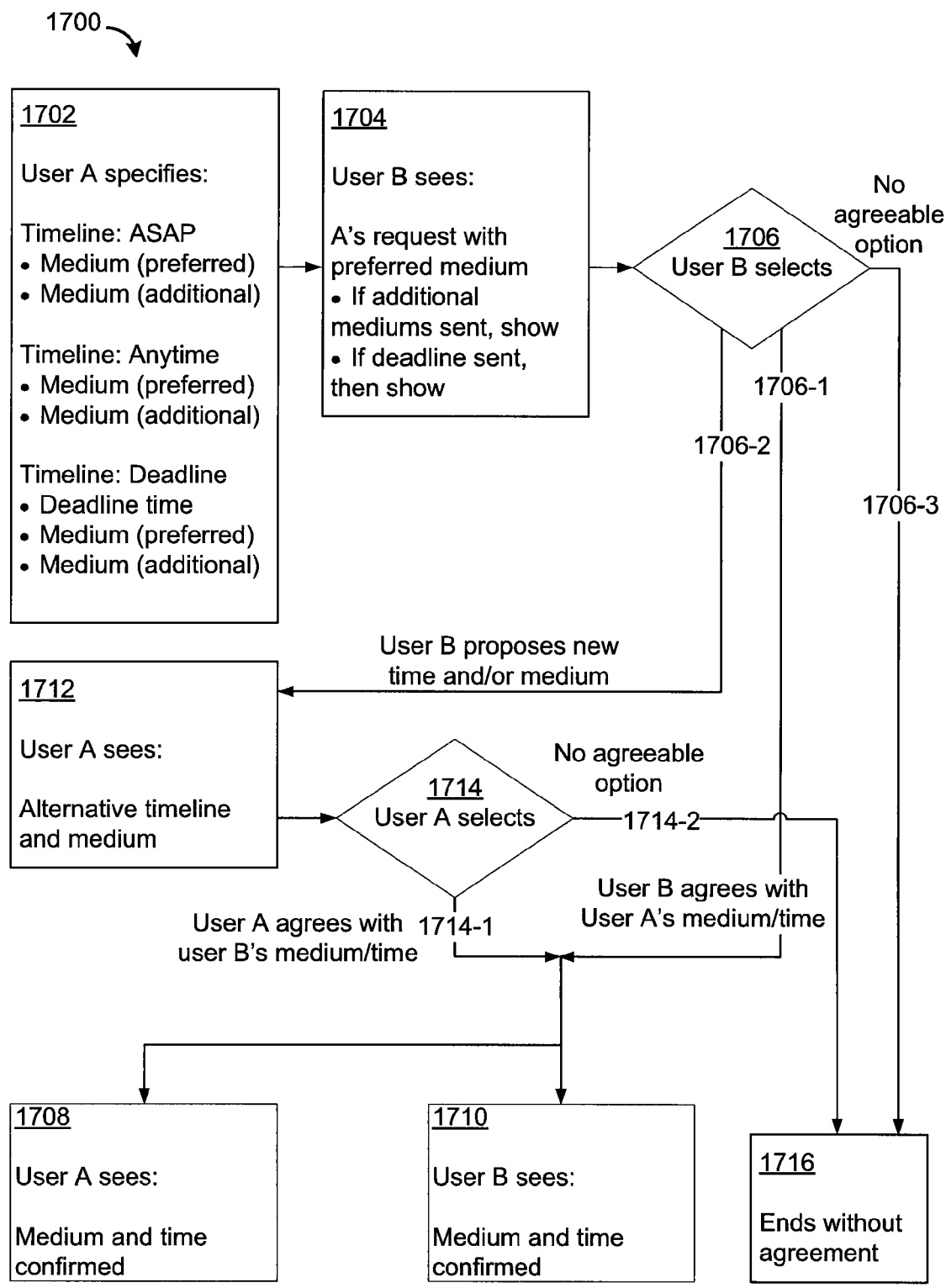
FIG. 17 is a flowchart illustrating steps in an exemplary Nudge sequence.

Referring now to FIGS. 16 and 17, these figures show system level flow charts of how in some embodiments the various components of the system interact and operate to support the Nudge and Ping features.

FIG. 16 is a flowchart illustrating steps in a Ping operation in accordance with some embodiments. As used herein, the first user (e.g., John Doe) is also referred to as User A, and the second user (e.g., Jane Doe) is also referred to as User B. With a Ping, User A (e.g., John Doe) specifies the intent to send a Ping by specifying which user (from a list of available users in the system) User A (e.g., John Doe) wants the Ping to be sent to and selects (1602) one of the predefined "reasons" for sending a Ping (see above). The Ping is then sent to the Notification Server (e.g., Central Server 1306 in FIG. 13), which then sends that Ping information to the various Clients (Mobile or Desktop) of the intended recipient, User B (e.g., Jane Doe). This is done through a pull-style HTTP GET call that periodically runs on the User B's client device, or is delivered push-style, through a third part cloud messaging provider. The particular implementation of how Pings (and Nudges) are delivered is not important, and alternative methods could be employed. The notification received by User B includes the "reason" selected by User A, as well as additional information about User A's state (e.g. location or activity). Thus, User B sees (1604) the "reason" and the additional information (e.g., presence information).

To demonstrate the advantages of the Ping, consider the following scenario: User A (e.g., John Doe) is running late to a scheduled meeting. Knowing he will not be present when the meeting starts, User A (e.g., John Doe) sends a Ping to User B (e.g., Jane Doe), the leader of the meeting. The Ping "reason" User A (e.g., John Doe) indicates is "running late." User B (e.g., Jane Doe) receives a notification on her mobile device (while in the meeting) that informs her User A (e.g., John Doe) is running late. It also provides his current presence state information, such as he is traveling or that he has not been excused from a previous meeting.

FIG. 17 shows the system interaction that occurs when Nudge is performed. To initiate a Nudge, User A (e.g., John Doe) specifies (1702) two items: 1) a time constraint of a proposed interaction, and 2) a proposed set of mediums. As FIG. 17 shows, User A (e.g., John Doe) has three options: specify a time constraint as "as soon as possible" (ASAP), specify a time constraint as "Anytime" (open ended constraint), or provide a deadline (specific date/time). User A (e.g., John Doe) can then select a preferred communication medium, as well as a set of acceptable alternatives. In some embodiments, when User A (e.g., John Doe) chooses to send the Nudge, a message is passed via an HTTP call to the Notification Server, the serve then sends the message via push or pull (as described for the Pings above) to User B's devices (e.g., Jane Doe's device) as a recipient device.

User B (e.g., Jane Doe) sees (1704) the information provided by User A (e.g., John Doe), and has three options: 1) agree to one of the time/medium combinations provided by User A (e.g., John Doe), 2) suggest an alternative time/medium (that are within the original constraints of User A), or 3) indicate that there is no agreeable option. If User B chooses option 1 (1706-1), a message is passed (e.g., via HTTP) to the Notification Server, and a confirmation message is then sent (1708 and 1710) to both User A's (e.g., John Doe) and User B's (e.g., Jane Doe) devices. If option 2 was selected (1706-2), User B is prompted to select an alternative time and/or medium selection. A message is then passed to the Notification Server, who then sends a message to the User A's device so that User A (e.g., John Doe) sees (1712) the alternative timeline and medium. In response to receiving the message, User A (e.g., John Doe) has two options: 1) agree to the alternative time/medium selection(s) or 2) indicate there is no agreeable option. If the first option is selected (1714-1), User A and User B (e.g., John Doe and Jane Doe) receive confirmation messages (1708 and 1710). In any situation where User A or User B (e.g., John Doe or Jane Doe) indicates that there is no agreeable time/medium (e.g., option 3 (1706-3) for the recipient, and option 2 (1714-2) for the initiator), the system will then send a message to both users (e.g., John Doe and Jane Doe) indicating that an agreement could not be made (1716).

In some embodiments, the users are presented with Nudge information linked to real-time information about a persons' physical location and activities. In some instances, this is implemented through the MyUnity system described above with reference to FIGS. 1-10. Alternatively, others could be used. This additional information allows users to make better informed selections when performing the Nudge interactions. For example, a user may not propose face-to-face interaction when the presence information indicates the other user is traveling or working from a remote location.

To demonstrate the advantage of the Nudge, consider the following simple scenario, which is shown in FIG. 17. User A (e.g., John Doe) is writing a document and needs to include information known by User B (e.g., Jane Doe). To gain this information, User A (e.g., John Doe) needs to have a conversation with User B (e.g., Jane Doe). User A (e.g., John Doe) initiates a Nudge to User B (e.g., Jane Doe) (1702). In the system, User A (e.g., John Doe) is informed that User B (e.g., Jane Doe) is working from an off-site location and decides that the best method to communicate is over the phone. User A (e.g., John Doe) also indicates interaction is needed ASAP, as not having the information from User B (e.g., Jane Doe) is preventing User A (e.g., John Doe) from finishing the document. User B (e.g., Jane Doe) receives the Nudge (1704), and responds by indicating that the "phone now" option is acceptable, but would prefer a "face-to-face" interaction when she arrives back in the office the next day (1706-2). User A (e.g., John Doe) receives the Nudge response (1712) and agrees to the alternate time/medium (1714-1).

Note that, while exemplary embodiments and illustrations have been described above with reference to two users, the methods and systems described herein are applicable to any number of users. For example, a user can send a Ping to one or more other users as described above for a single recipient, and a user can also employ a Nudge sent to multiple users to enable a time and medium to be agreed on for a large meeting or conference call, as one example.

Figure 18:
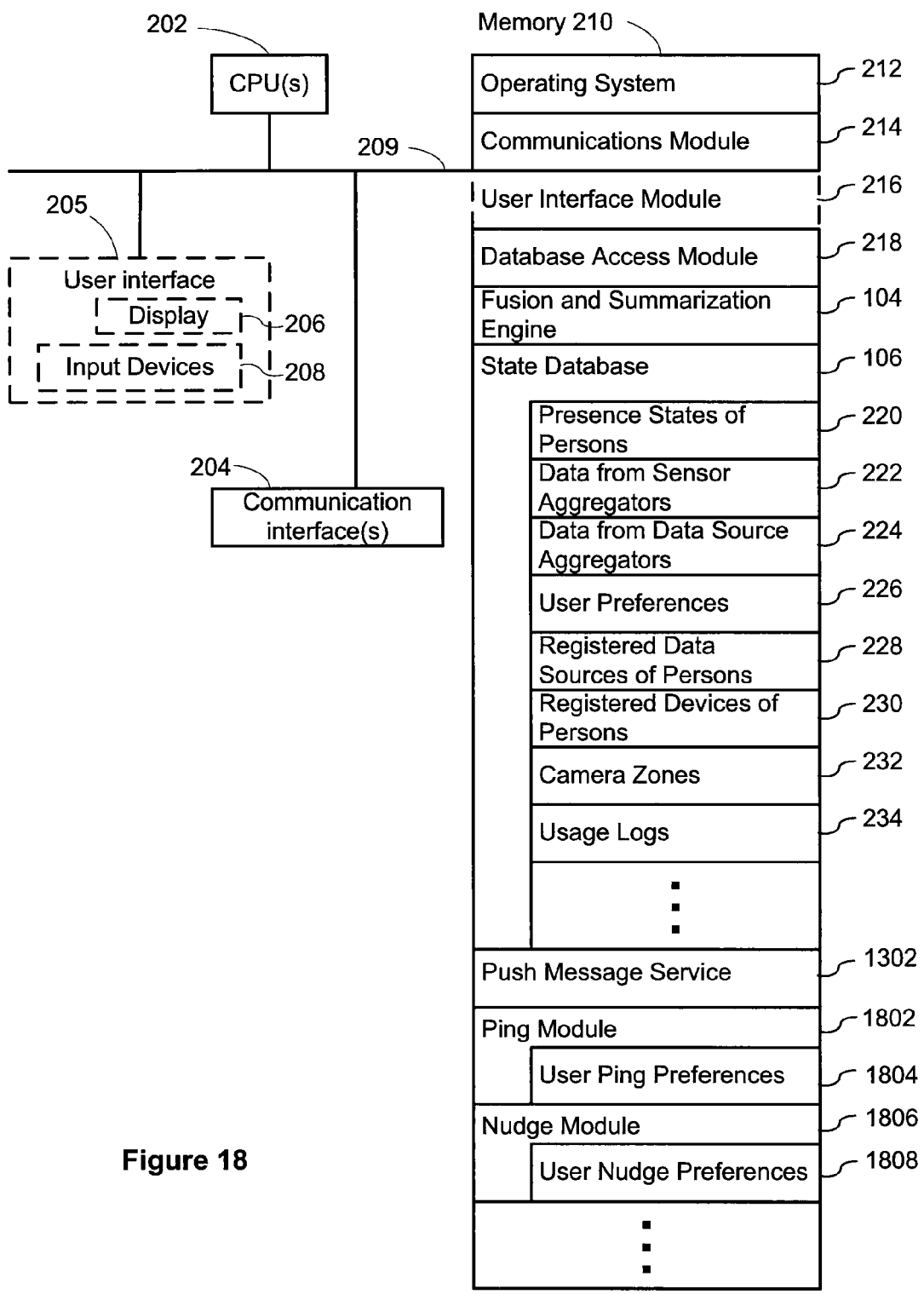
FIG. 18 is a block diagram illustrating a server, according to some embodiments.

Referring to FIG. 18, there is shown a block diagram illustrating a server 102/1306, according to some embodiments. This figure is similar to FIG. 2, which shows a server 102 configured to aggregate presence information (for example, a server associated with FXPAL's MyUnity system), and all descriptions provided with respect to FIG. 2 are also applicable to FIG. 18. Differences between FIGS. 2 and 18 are due to additional elements that are incorporated in the system 102/1306 to perform server methods associated with Ping and Nudge operations. Accordingly, in some embodiments the server 1306 includes a Ping module 1802, which implements methods associated with performing the server's operations for a Ping, and a Nudge module 1806, which implements methods associated with performing the server's operations for a Nudge. For example, these modules 1802, 1806 are employed by the server in some embodiments to perform the Ping and Nudge methods 1400 and 1500 described in reference to FIGS. 14 and 15. Supporting these modules, the server 1306 also includes user Ping preferences 1804 and user Nudge preferences 1808, which store user settings that pertain to the Ping and Nudge operations, respectively. For example, the Nudge preferences 1808 can be used to store information on what particular mediums of communications are preferred by a particular user for particular time of day or status (e.g., in car, on vacation, etc.). The server can also optionally include a push message service 1302, which performs message push operations as described with respect to FIGS. 14 and 15. This service 1302 can be implemented on a separate computer system as well as on the server 1306. An exemplary Nudge method that can be implemented at the server in the Nudge module 1806 is now described with reference to FIGS. 11 and 12.

Figure 11:
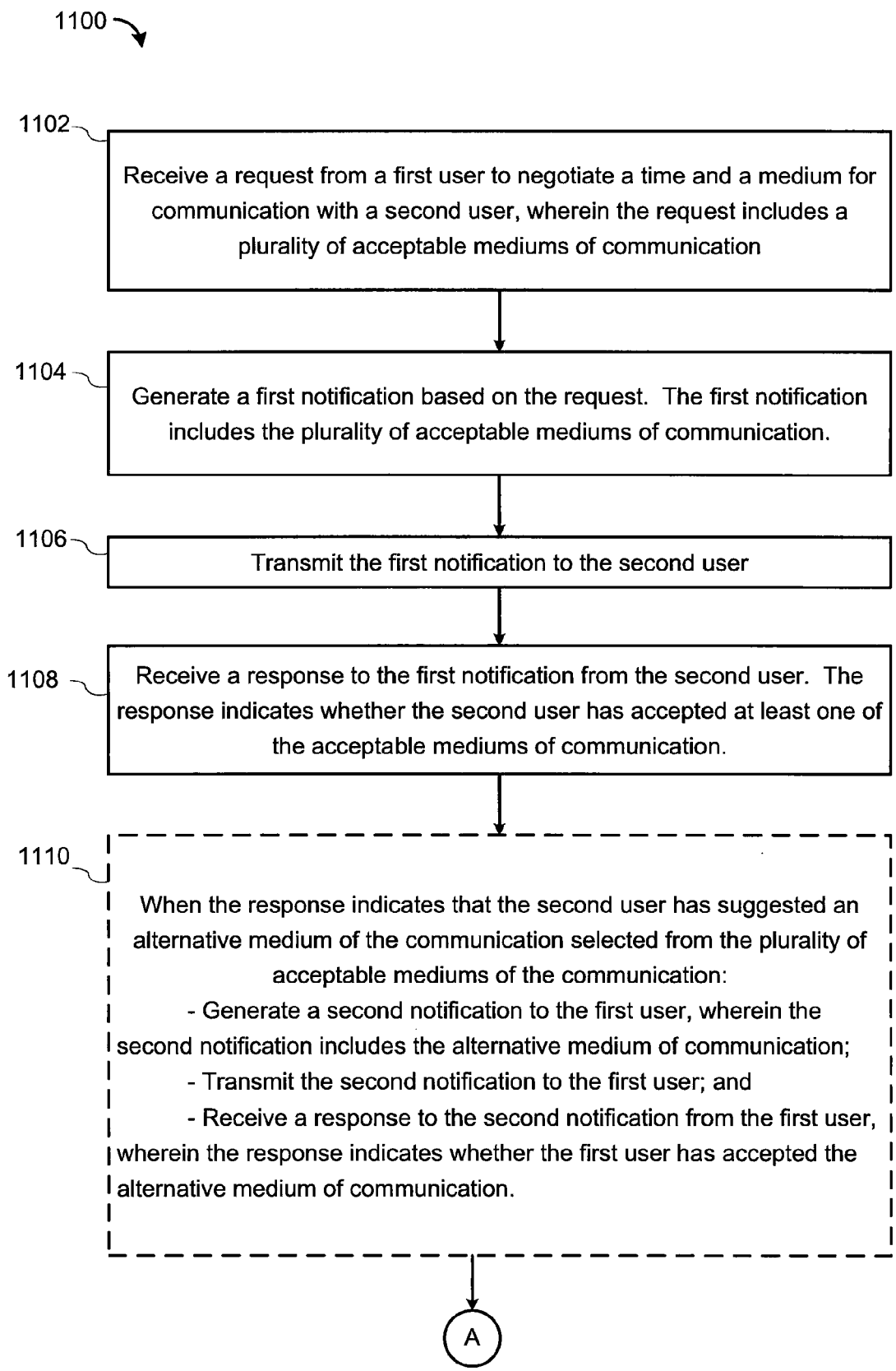
FIGS. 11 and 12 are flowcharts of a method for negotiating a time and medium of communication according to some embodiments.
Figure 12:
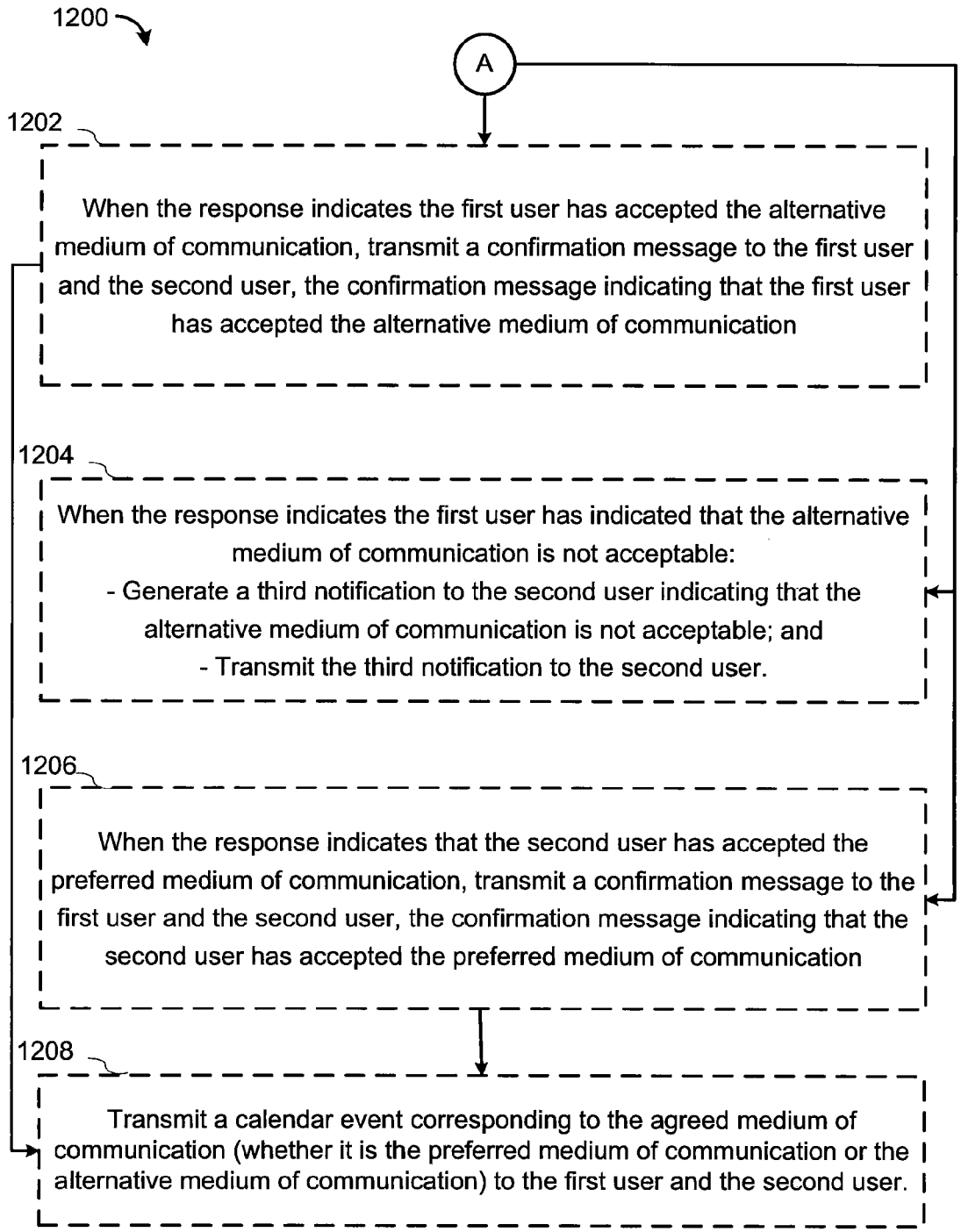

FIGS. 11 and 12 are flowcharts of methods 1100, 1200 for negotiating a time and medium of communication in a server 1306 according to some embodiments. Note that there is no fixed ordering implied in the arrangement of operations depicted in these figures as in many cases the operations are independent and therefore interchangeable. Referring to FIG. 11, in some embodiments the method 1100 includes receiving a request from a first user to negotiate a time and a medium for communication with a second user (1102). The request includes a plurality of acceptable mediums of communication (1102). The method 1100 also includes generating a first notification based on the request (1104), wherein the first notification includes the plurality of acceptable mediums of communication (1104). The method includes transmitting the first notification to the second user (1106), and receiving a response to the first notification from the second user (1108). The response indicates whether the second user has accepted at least one of the acceptable mediums of communication (1108).

In some embodiments, when the response indicates that the second user has suggested an alternative medium of the communication selected from the plurality of acceptable mediums of the communication (1100), the method includes generating a second notification to the first user, wherein the second notification includes the alternative medium of communication. In such embodiments, the method also includes transmitting the second notification to the first user (1100), and receiving a response to the second notification from the first user (1100). The response indicates whether the first user has accepted the alternative medium of communication (1100).

Note that at operation (1102) it is not required that the first user specify a preferred medium of communication in addition to a plurality of acceptable mediums. In fact, in some embodiments, the first user might propose a single preferred medium and no alternatives, or a plurality of alternatives and no preferred medium, one preferred medium and one alternative medium; or a plurality of preferred mediums and a plurality of alternative mediums.

Referring to FIG. 12, in some embodiments the method 1200 includes a number of alternative approaches to allow the first and second users to converge on an agreed communication medium, even if that is not the preferred medium proposed by the first user. These alternatives include:

When the response indicates the first user has accepted the alternative medium of communication, transmitting a confirmation message to the first user and the second user, the confirmation message indicating that the first user has accepted the alternative medium of communication (1202);

When the response indicates the first user has indicated that the alternative medium of communication is not acceptable: generating a third notification to the second user indicating that the alternative medium of communication is not acceptable; and transmitting the third notification to the second user (1204);

When the response indicates that the second user has accepted the preferred medium of communication, transmitting a confirmation message to the first user and the second user, the confirmation message indicating that the second user has accepted the preferred medium of communication (1206); and When a medium of communication (and time) for a meeting is agreed on between the first and second users, transmitting a calendar event corresponding to the agreed medium of communication (whether it is the preferred medium of communication or the alternative medium of communication) to the first user and the second user (1208).

In some embodiments, the request from the first user is received in response to a phone call made by the first user to the second user, when the second user rejected the phone call and requested that the first user generate the request to the second user.

In some embodiments, the request from the first user is received in response to a phone call made by the first user to the second user, when the phone call to the second user has failed.

In some embodiments, the first notification is a structured notification, and the plurality of mediums is presented to the second user as a list of mediums of communication that are specified by the first user.

In some embodiments, the request includes a plurality of times including a preferred time of the communication.

In some embodiments, the first notification is a structured notification, and the plurality of times is presented to the second user as a list of time of communication that are specified by the first user. In some embodiments, the plurality of times includes time constraints selected from the group consisting of: "as soon as possible," "anytime," "a particular date and a particular time," "before a particular date and particular time," and "after a particular date and particular time."

Figure 19:
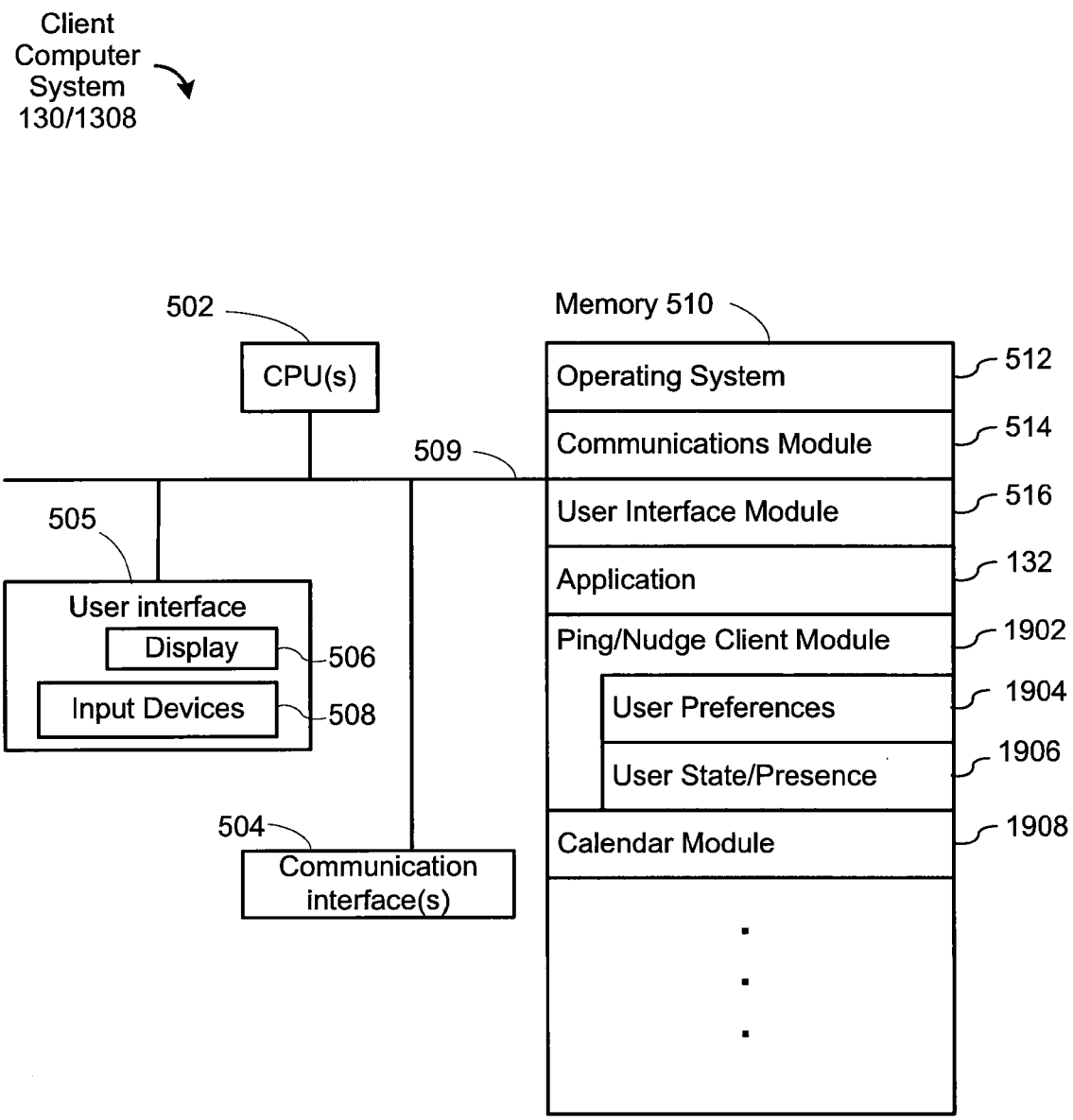
FIG. 19 is a block diagram illustrating a client, according to some embodiments.

Referring to FIG. 19, a block diagram is shown illustrating a client 130/1308 according to some embodiments. This figure is similar to FIG. 5, which shows a client computer system 130/1308 configured to interoperate with a server 102 and other system components, which are described in reference to FIGS. 1-4 and 13. Accordingly, all descriptions provided with respect to FIG. 2 are also applicable to FIG. 18. In addition to being configured to perform client methods associated with Ping and Nudge features and display the associated screens and dialogs, the client 130/1308 in some embodiments is also capable of presenting and receiving aggregated presence information for multiple users/contacts of the user of the client 130/1308. Differences between the client device 130 shown in FIG. 5 and the client device 130/1308 of FIG. 19 are due in part to the client device 130/1308 including a Ping/Nudge client module 1902 and associated user preferences 1904 and user state/presence information 1906. These modules are employed by the client to perform the Ping and Nudge methods 1400 and 1500 described in reference to FIGS. 14 and 15. In particular, these modules are configured to display the dialog and other screens illustrated in FIGS. 14 and 15 and implement the operations described therein. The user preferences 1904 stores individual communication preferences for each user, including preferred mediums of communication associated with particular times. The presence information 1906 can be presence information for the user of the client 130/1308 or presence information communicated to the client for other users, which is useful for performing Nudges.

Nudge and Ping Integration with Presence Information

Figure 20:
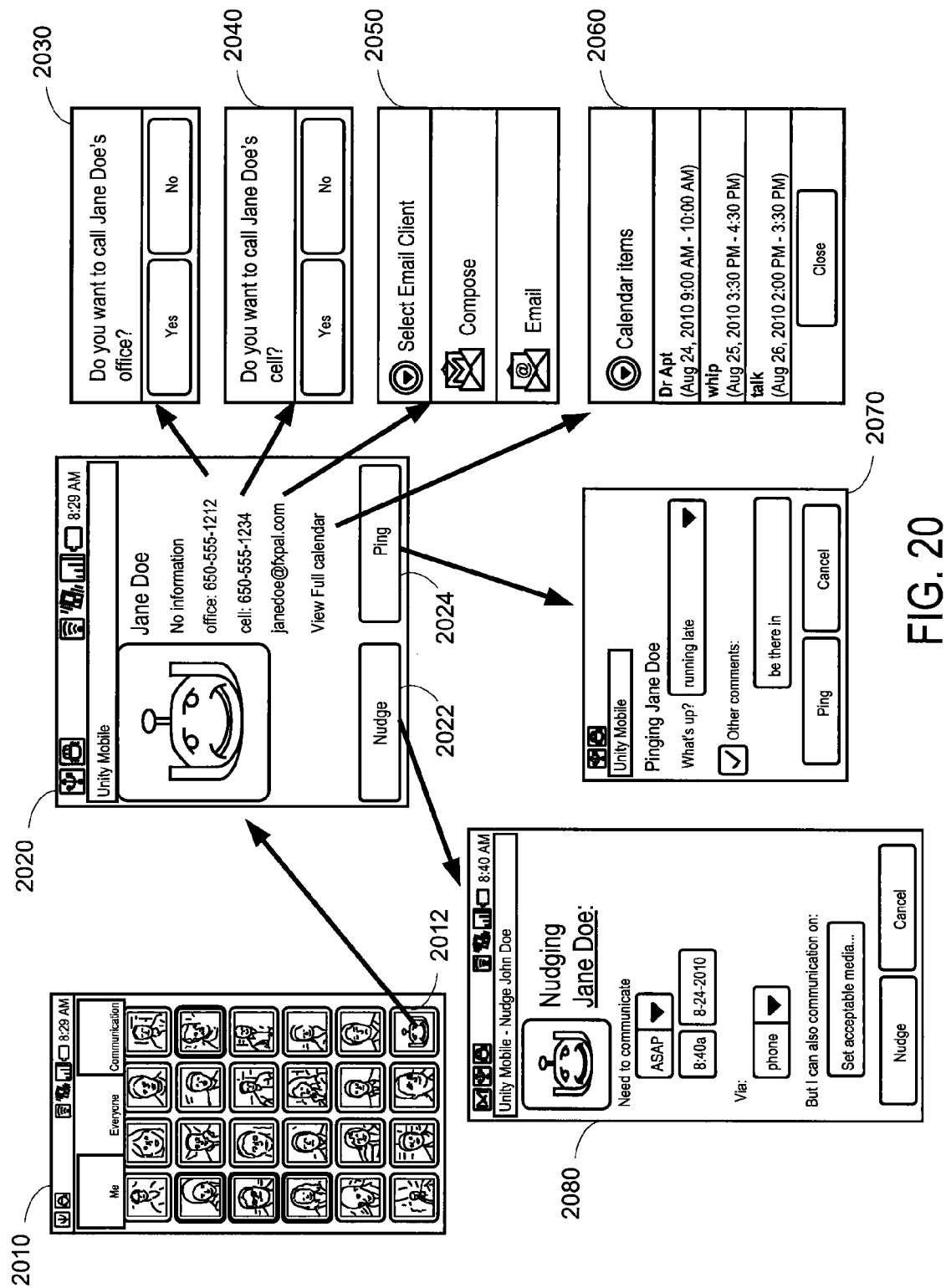
FIG. 20 shows a collection of screenshots associated with exemplary Nudge and Ping sequences that highlight possible operations that start from a display of presence information.

FIG. 20 shows a collection of screens associated with exemplary Nudge or Ping Sequences that highlight possible operations that start from a display of presence information that can be provided in some embodiments by FXPAL's MyUnity application. The Nudge and Ping operations that are initiated from the screen 2010 are consistent with those described above, the difference being that the user of the client on which the screen 2010 is displayed initiates the Ping or Nudge by selection a thumbnail image of a contact displayed in the MyUnity window (e.g., thumbnail image 2012) on a client device (e.g., 1308, FIG. 13). An advantage of this integrated arrangement is that the MyUnity system provides presence information for users with whom the user of the client wishes to communicate. In some embodiments, the presence information includes the presence state described above with reference to FIGS. 1-10. In some embodiments, in addition to the presence information for a second user, Jane Doe, the user of the client sees contact and calendar information for the second user (e.g., Jane Doe) prior to initiating a Nudge or Ping to the second user (e.g., Jane Doe) (e.g., the screen 2020). In some embodiments, in response to the first user's selection of the Nudge 2022, a Nudge screen 2080 is displayed on the device associated with the first user (e.g., John Doe). In some embodiments, in response to the first user's selection of the Ping 2024, a Ping screen 2070 is displayed on the device associated with the first user (e.g., John Doe).

In some embodiments, the screen 2020 includes one or more additional user interface objects that when selected initiate corresponding operations. For example, in some embodiments, in response to the first user's selection of an office phone number, a call screen 2030 is displayed on the device associated with the first user (e.g., John Doe), confirming whether the first user (e.g., John Doe) wants to call the second user's office (e.g., Jane Doe's office). Alternatively, in some embodiments, in response to the first user's selection of an office phone number, the device associated with the first user (e.g., John Doe) calls the second user's office without asking for a confirmation. In some embodiments, in response to the first user's selection of a cell phone number, a call screen 2040 is displayed on the device associated with the first user (e.g., John Doe). In some embodiments, in response to the first user's selection of an email address, an email screen 2050 is displayed on the device associated with the first user (e.g., John Doe). As illustrated, the email screen 2050 may request that the first user (e.g., John Doe) select an email client (e.g., "compose" for drafting an email, or "email" for viewing emails from the other person). Alternatively, the email screen 2050 may include a screen for drafting emails, without requesting the first user (e.g., John Doe) to select an email client. In some embodiments, in response to the first user's selection of a calendar option (e.g., "View Full calendar"), a calendar information screen 2060 is displayed on the device associated with the first user (e.g., John Doe). The calendar information screen 2060 may include upcoming events in the second user's calendar (e.g., Jane Doe's calendar).

Figure 21:
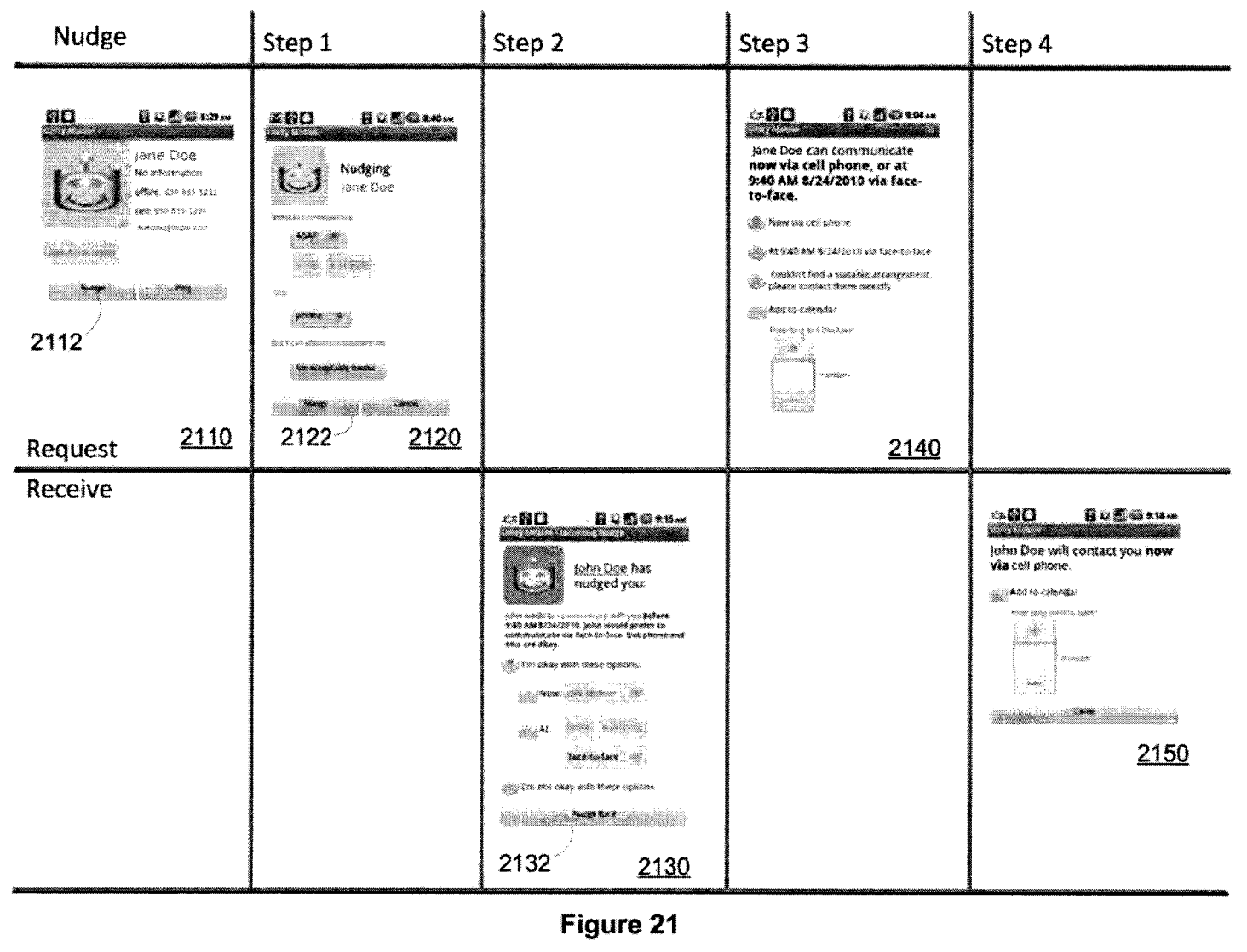

FIG. 21 goes on to show a sequence of operations through which a first user, John Doe, initiates and carries out a Nudge operation with a second user, Jane Doe, selected from the screen shown in FIG. 20. As illustrated, the sequence of operations includes displaying a screen 2110 (corresponding to the screen 2020 in FIG. 20) at a first device associated with the first user (e.g., John Doe). In response to the first user selecting a Nudge user interface object 2112, a Nudge screen 2120 (corresponding to the screen 2080 in FIG. 20 and similar to 1504 in FIG. 15) is displayed at the first device (step 1). In response to the first user selecting a Nudge user interface object 2122, a screen 2130 (similar to the screen 1506 in FIG. 15) is displayed at a second device associated with the second user (e.g., Jane Doe) (step 2). In some embodiments, the screen 2130 also includes the presence state of the first user (e.g., John Doe). In response to the second user (e.g., Jane Doe) selecting a "Nudge back" user interface object 2132, a screen 2140 (similar to the screen 1508 in FIG. 15) is displayed at the first device (step 3). In response to the first user (e.g., John Doe) selecting an acceptance of an acceptable time and communication medium (e.g., "now" and "via cell phone"), a screen 2150 (similar to the screen 1516 in FIG. 15) including a confirmation message is displayed at the second device (step 4). In some embodiments, a similar confirmation message is displayed at the first device.

Figure 22:
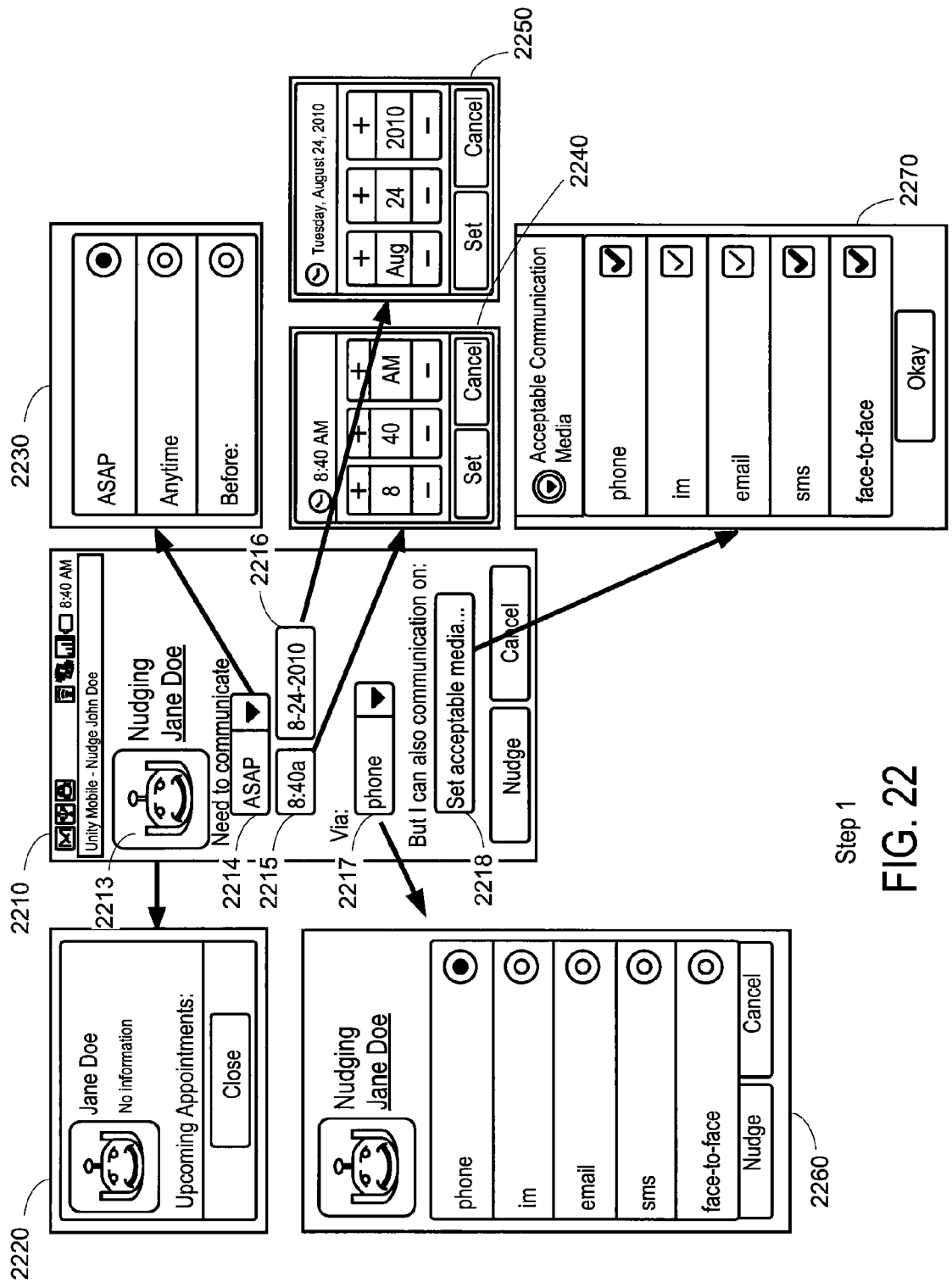
FIG. 22 shows a series of screenshots associated with step 1 of a Nudge sequence.
Figure 23:
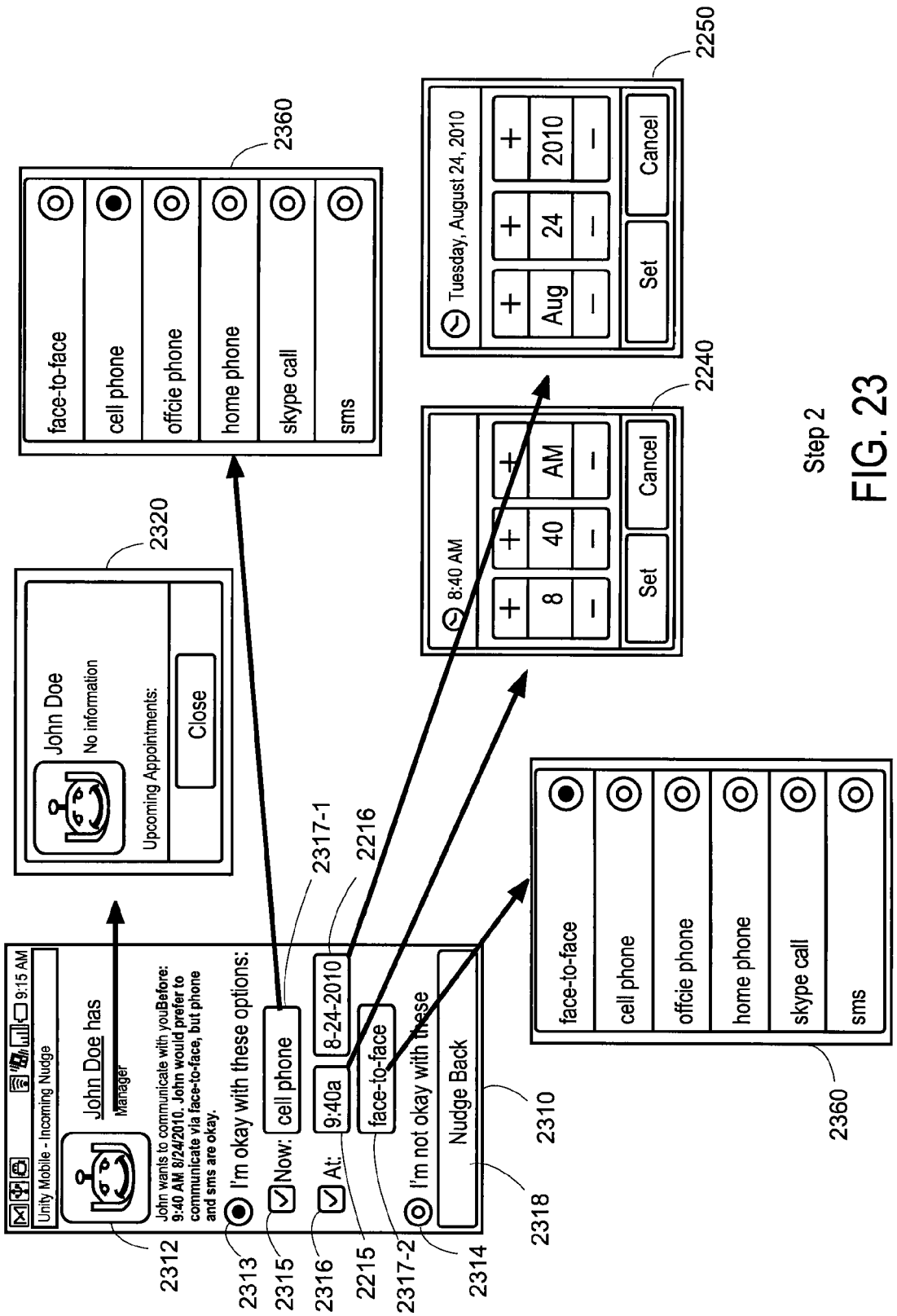
FIG. 23 shows a series of screenshots associated with step 2 of a Nudge sequence.

FIGS. 22 and 23 show screenshots associated with this Nudge operation illustrated in FIG. 21. The operations of a Nudge and the description of UI elements and screens described with respect to FIG. 15 apply to these figures, and thus are not repeated.

FIG. 22 illustrates a Nudge screen 2210 (corresponding to the screen 2080 in FIGS. 20 and 2120 in FIG. 21, and similar to the screen 1504 in FIG. 15). In some embodiments, in response to a user selection of a thumbnail image 2213 by a first user (e.g., John Doe), a user information screen 2220 is displayed. As illustrated, the user information screen 2220 includes additional information about the second user (e.g., Jane Doe) (e.g., the second user's upcoming appointments).

In some embodiments, in response to the first user's selection of a time user interface object 2214, a time selection screen 2230 is displayed. As illustrated, the time selection screen 2230 has a plurality of options (e.g., "ASAP (as soon as possible)," "anytime," and "before"). When the "before" option is selected, in the time selection screen 2230 or by default, additional time information can be received from the user (e.g., a critical time before which the user wants to communicate with the second user, such as before "8:40 AM" on Aug. 24, 2010). In some embodiments, the critical time is determined automatically based on the current time (e.g., the time the first user (e.g., John Doe) views the Nudge screen 2210). For example, the critical time can be set as 30 minutes from the current time. Typically, the first user (e.g., John Doe) may provide or modify the critical time. In response to the first user's selection of an hour user interface object 2215, an hour selection screen 2240 is displayed. In response to the first user's selection of a date selection user interface object 2216, a date selection screen 2250 is displayed.

In some embodiments, in response to the first user's selection of a medium selection user interface object 2217, a medium selection screen 2260 is displayed, enabling the first user to select a desired medium (e.g., preferred medium) for communication. The medium selection screen 2260, as illustrated, includes phone, instant messaging (IM), email, short message service (SMS), and face-to-face communication as options. In some embodiments, a plurality of mediums of communication shown in the medium selection screen 2260 is obtained from a profile of the first user. In some embodiments, the plurality of mediums of communication shown in the medium selection screen 2260 is obtained or determined in accordance with a presence state of the second user (e.g., a "face-to-face" option may not be available while the second user is in another country). In some embodiments, the presence state of the second user includes a location and an activity of the second user. In some embodiments, the Nudge screen 2210 also includes an acceptable medium selection user interface object 2218. In such embodiments, in response to the first user's selection of the acceptable medium selection user interface object 2218, an acceptable medium selection screen 2270 is displayed. The description of the medium selection screen 2260 applies to the acceptable medium selection screen 2270.

FIG. 23 illustrates a screen 2310 (corresponding to the screen 2130 in FIG. 21) that enables a receiver of a Nudge (e.g., Jane Doe) to Nudge Back in accordance with some embodiments. In response to the second user's selection of a thumbnail image 2312 of the first user (e.g., John Doe), a user information screen 2320 is displayed. Typically, the user information screen 2320 includes additional information about the first user (e.g., the first user's upcoming appointments). As illustrated, the second user (e.g., Jane Doe) is asked to indicate whether at least one of the suggested times/mediums is acceptable by selecting one of the user interface objects, such as a button 2313 ("I'm ok with these options") or a button 2314 ("I'm not ok with these options"). In some embodiments, when indicating that at least one of the suggested times/mediums is acceptable, the second user (e.g., Jane Doe) indicates one or more acceptable times (e.g., by checking/unchecking a check box 2315 ("now") and/or a check box 2316 for selecting a later time). In such embodiments, the second user (e.g., Jane Doe) may select a medium for communication for each acceptable time. In response to the second user's selection of a medium selection user interface object 2317-1 or 2317-2, an acceptable medium selection screen 2360 is displayed. The acceptable medium selection screen 2360 is similar to the acceptable medium selection screen 2260 shown in FIG. 22, except that the acceptable medium selection screen 2360 includes additional mediums, such as cell phone, office phone, home phone, and a Skype™ call. Additionally or alternatively, the acceptable mediums may include a video chat. When the check box 2316 is checked, the second user (e.g., Jane Doe) may change the acceptable time. In response to the second user's selection of an hour selection user interface object 2215, the hour selection screen 2240 is displayed. In response to the second user's selection of a date selection user interface object 2216, the date selection screen 2250 is displayed. The screen 2310 also includes a Nudge Back user interface object 2318, which when selected initiates sending the Nudge Back information to a server (e.g., the server 1306 in FIG. 13).

Figure 24:
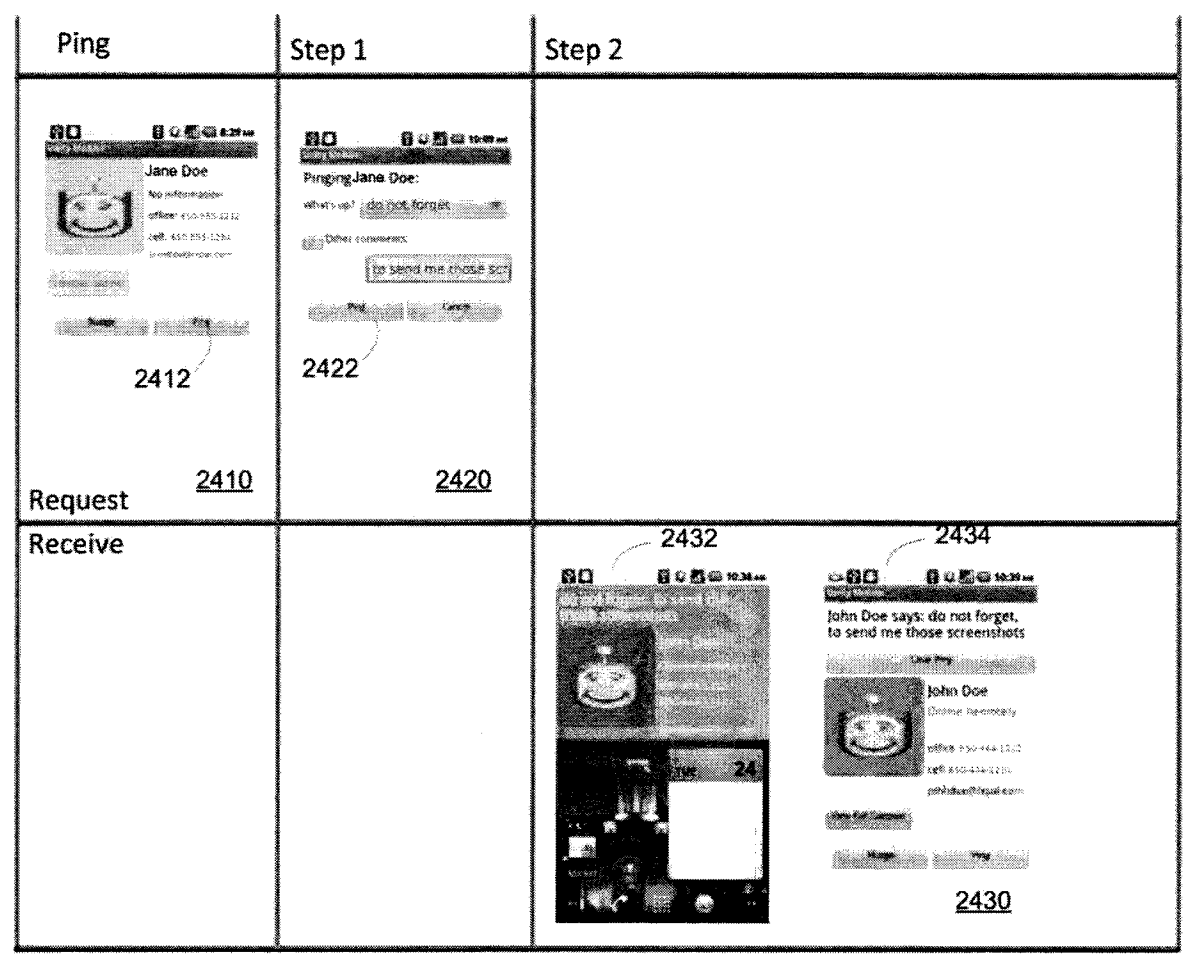

Similar to FIG. 21, FIG. 24 goes on to show a sequence of operations through which a first user (e.g., John Doe) initiates and carries out a Ping operation with a second user (e.g., Jane Doe) selected from the screen shown in FIG. 20. As illustrated, the sequence of operations includes displaying a screen 2410 (corresponding to the screen 2020 in FIG. 20) at a first device associated with the first user (e.g., John Doe). In response to the first user (e.g., John Doe) selecting a Ping user interface object 2412, a Ping screen 2420 (corresponding to the screen 2070 in FIG. 20 and similar to 1404 in FIG. 14) is displayed at the first device (step 1). In response to the first user (e.g., John Doe) selecting a Ping user interface object 2422, a screen 2432 (similar to the screen 1410 in FIG. 14) is displayed (2430) at a second device associated with the second user (e.g., Jane Doe) (step 2). Alternatively, the Ping information can be displayed in a different format and style (e.g., a screen 2434). As illustrated, the screen 2432 includes the Ping information (e.g., the message from the first user) and information about the first user (e.g., John Doe). In some embodiments, the screen 2432 also includes user interface objects to enable the second user (e.g., Jane Doe) to initiate a Nudge operation or a Ping operation on the second device (e.g., similar to the Nudge user interface object 2022 and the Ping user interface object 2024 shown in FIG. 20, respectively).

Figure 25:
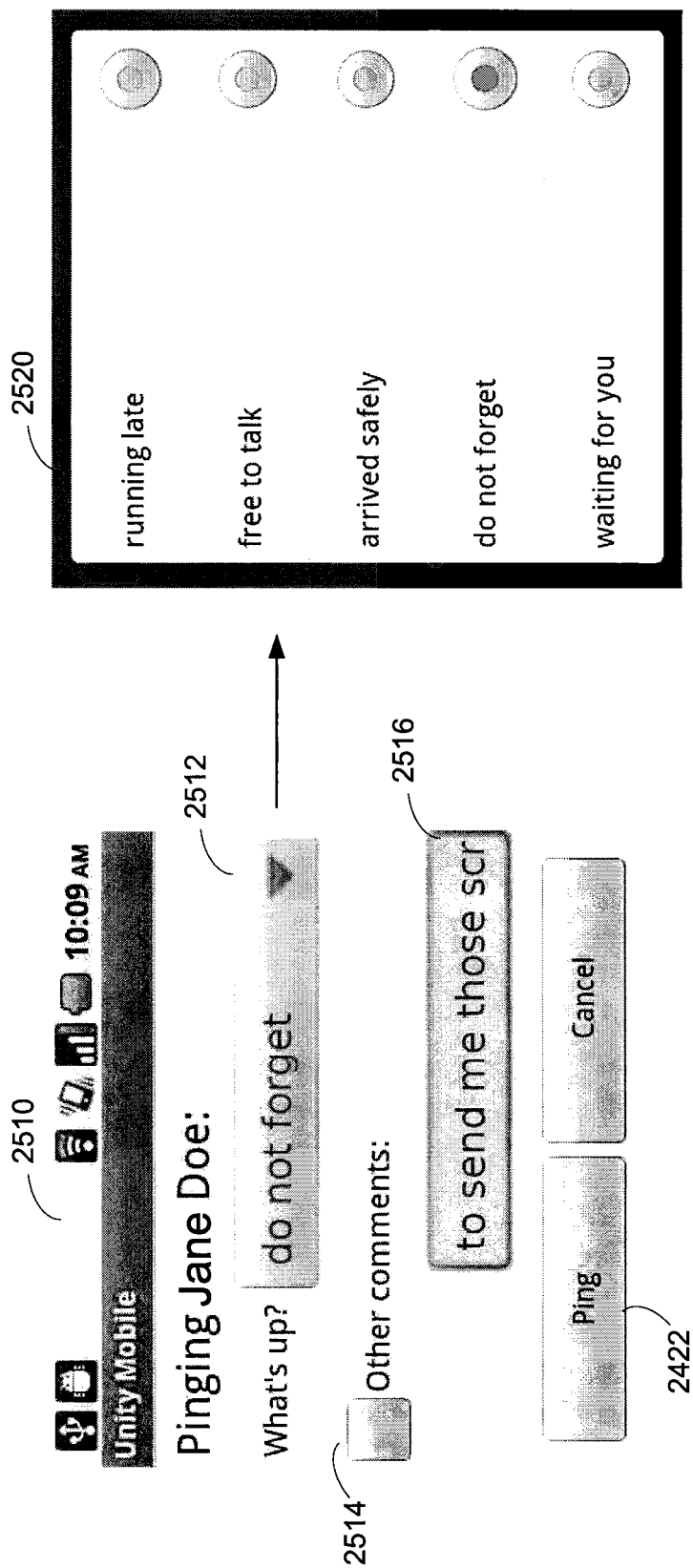
FIG. 25 shows a series of screenshots associated with an exemplary Ping sequence that highlights a possible order of send and receive operations and roles.

FIG. 25 illustrates screenshots for this Ping operation associated with step 1 from FIG. 24. The operations of a Ping and the description of UI elements and screens described with respect to FIG. 14 apply to these figures, and thus are not repeated.

FIG. 25 includes a Ping screen 2510 (corresponding to the screen 2070 in FIGS. 20 and 2420 in FIG. 24, and similar to the screen 1404 in FIG. 14). A message user interface object 2512 includes at least one of a plurality of predefined messages (e.g., "do not forget"). In some embodiments, in response to a user selection of the message user interface object 2512, a message selection screen 2520 is displayed. As illustrated, the message selection screen 2520 includes a plurality of predefined messages, such as "running late," "free to talk," "arrived safely," "do not forget," and "waiting for you." A user may select one of the plurality of predefined messages by selecting a respective button associated with a respective predefined message.

In some embodiments, the Ping screen 2510 includes user interface objects for sending additional comments. As illustrated, the Ping screen 2510 includes an "other comment" check box 2514. In response to a user selection of the check box 2514, a text field 2516 is activated to receive user inputs for additional comments.

The Ping screen 2510 includes a Ping user interface object 2422, which when activated initiates sending the Ping information to a server (e.g., the server 1306 in FIG. 13).

Systems and methods have been described for facilitating user-initiated communication between non-co-located users through structured negotiation. Advantages of some embodiments include:
  The structured negotiation consists of a constrained set of interactions between initiator and receiver that contains:
    a desired time of a proposed communication, and
    a desired medium of a communication.
  The structured negotiation allows for mutual negotiation between initiator and receiver.
  Mutual negotiation can allow both the initiator and receiver to:
    Propose an alternate time or times of proposed communication,
    Propose an alternate medium or set of mediums of a proposed communication,
    Propose a state of no agreement on time and/or medium.
  The interaction that embodies the structured negotiation can be performed on a variety of devices, including: smartphone devices, laptop computers, and desktop computers.
  Structured negotiation may also disclose information about the receiver's and/or initiator's current physical state, activity and/or location.

If a user performs a structured negotiation interaction on a smartphone device, additional information about the phone's physical location may be disclosed to the initiator and/or receiver.

Users of smartphone devices can independently control information relayed to the system and other users, such as the level of location, activity, presence and/or other information related to the system and user.

Users may also be shown information about the receiver's and/or initiator's current physical state, activity or location when initiating or receiving communication (e.g. placing/receiving a call, sending/receiving email).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for negotiating a time and a medium for communications between users, comprising:
    at a server including one or more processors and memory storing one or more programs, the one or more processors executing the one or more programs to perform the operations of:
        receiving a request from a first user to negotiate a time and a medium for communication with a second user, wherein the request includes a plurality of mediums of communication selected by the first user;
        generating a first notification based on the request, wherein the first notification includes the plurality of mediums of communication selected by the first user;
        transmitting the first notification to the second user, wherein the first notification is transmitted to at least a subset of one or more devices registered to the second user; and
        receiving a presence state of the second user and a response to the first notification from the second user, wherein the response indicates whether the second user has accepted at least one of the plurality of mediums of communication selected by the first user.

2. The method of claim 1, wherein the plurality of mediums of communication includes a preferred medium of communication selected by the first user, and the response indicates whether the second user has accepted the preferred medium of communication.

3. The method of claim 1, further comprising:
    when the response indicates that the second user has suggested an alternative medium of communication selected from the plurality of mediums of the communication selected by the first user:
        generating a second notification to the first user, wherein the second notification includes the alternative medium of communication;
        transmitting the second notification to the first user; and
        receiving a response to the second notification from the first user, wherein the response indicates whether the first user has accepted the alternative medium of communication.

4. The method of claim 3, further comprising:
    when the response to the second notification indicates that the first user has accepted the alternative medium of communication, transmitting a confirmation message to the first user and the second user, the confirmation message indicating that the first user has accepted the alternative medium of communication.

5. The method of claim 3, further comprising transmitting a calendar event confirming an agreed-on medium and time for communication to the first user and the second user.

6. The method of claim 1, further comprising transmitting a calendar event confirming an agreed-on medium and time for communication to the first user and the second user.

7. The method of claim 3, wherein when the response from the first user indicates the first user has indicated that the alternative medium of communication is not acceptable, the method further comprising:
    generating a third notification to the second user indicating that the alternative medium of communication is not acceptable; and
    transmitting the third notification to the second user.

8. The method of claim 2, further comprising:
    when the response indicates that the second user has accepted the preferred medium of communication or another of the plurality of mediums of communication selected by the first user, transmitting a confirmation message to the first user and the second user, the confirmation message indicating that the second user has accepted the preferred medium of communication or another of the plurality of mediums of communication selected by the first user.

9. The method of claim 8, further comprising transmitting a calendar event corresponding to the preferred medium of communication or the another of the plurality of mediums of communication selected by the first user to the first user and the second user.

10. The method of claim 1, further comprising:
    when the response indicates that the second user has accepted at least one of the mediums of communication selected by the first user, transmitting a confirmation message to the first user and the second user, the confirmation message indicating that the second user has accepted at least one of the mediums of communication selected by the first user.

11. The method of claim 1, further comprising:
    when the response indicates that the second user has indicated that mediums in the plurality of mediums of communication are not acceptable:
        generating a fourth notification to the first user indicating that the mediums in the plurality of mediums of communication are not acceptable; and
        transmitting the fourth notification to the first user.

12. The method of claim 1, wherein the plurality of mediums of communication includes mediums of communication selected from the group consisting of:
    face-to-face;
    phone;
    sms;
    video chat;
    instant messaging; and
    email.

13. The method of claim 1, wherein the plurality of mediums of communication is obtained from a profile of the first user.

14. The method of claim 1, wherein the plurality of mediums of communication is obtained in accordance with a presence state of the first user.

15. The method of claim 14, wherein the presence state of the first user includes one or more of: a location and an activity of the first user.

16. The method of claim 14, wherein the first notification includes the presence state of the first user.

17. The method of claim 1, wherein the response to the first notification is automatically generated based at least on a presence state of the second user.

18. The method of claim 17, wherein the response is automatically generated further based on one or more rules defined by the second user.

19. The method of claim 18, wherein the one or more rules are configured to process requests from respective classes of users.

20. The method of claim 19, wherein the one or more rules include rejecting requests from a first class of users.

21. The method of claim 1, wherein the response to the first notification is generated automatically based at least on a self-reported state of the second user.

22. The method of claim 1, wherein the request from the first user is received in response to a phone call made by the first user to the second user, wherein the second user rejected the phone call and requested that the first user generate the request to the second user.

23. The method of claim 1, wherein the request from the first user is received in response to a phone call made by the first user to the second user, wherein the phone call to the second user failed.

24. The method of claim 1, wherein the response is transmitted to at least a subset of one or more devices registered to the first user.

25. The method of claim 3, wherein the second notification is transmitted to at least a subset of one or more devices registered to the first user.

26. The method of claim 1, wherein the first notification is a structured notification, and the plurality of mediums is presented to the second user as a list of mediums of communication that are specified by the first user.

27. The method of claim 1, wherein the request includes a plurality of times including a preferred time of the communication.

28. The method of claim 27, wherein the first notification is a structured notification, and the plurality of times is presented to the second user as a list of time of communication that are specified by the first user.

29. The method of claim 27, wherein the plurality of times includes time constraints selected from the group consisting of:

as soon as possible;
anytime;
a particular date and a particular time;
before a particular date and particular time; and
after a particular date and particular time.

30. A system for negotiating a time and a medium for communications between users, comprising:
one or more processors;
memory; and
one or more programs stored in the memory for execution by the one or more processors, the one or more programs comprising instructions to:
receive a request from a first user to negotiate a time and a medium for communication with a second user, wherein the request includes a plurality of mediums of communication selected by the first user;
generate a first notification based on the request, wherein the first notification includes the plurality of mediums of communication selected by the first user;
transmit the first notification to the second user, wherein the first notification is transmitted to at least a subset of one or more devices registered to the second user; and
receive a presence state of the second user and a response to the first notification from the second user, wherein the response indicates whether the second user has accepted at least one of the plurality of mediums of communication selected by the first user.

31. A non-transitory computer readable storage medium storing one or more programs configured for execution by a computer, the one or more programs comprising instructions to:
receive a request from a first user to negotiate a time and a medium for communication with a second user, wherein the request includes a plurality of mediums of communication selected by the first user;
generate a first notification based on the request, wherein the first notification includes the plurality of mediums of communication selected by the first user;
transmit the first notification to the second user, wherein the first notification is transmitted to at least a subset of one or more devices registered to the second user; and
receive a presence state of the second user and a response to the first notification from the second user, wherein the response indicates whether the second user has accepted at least one of the plurality of mediums of communication selected by the first user.

* * * * *